(12) United States Patent
James

(10) Patent No.: US 9,028,655 B2
(45) Date of Patent: *May 12, 2015

(54) CONTAMINANT CONTROL SYSTEM IN AN EVAPORATIVE WATER TREATING SYSTEM

(75) Inventor: Kenneth James, Calgary (CA)

(73) Assignee: InSite Technologies Ltd., Calgary, Alberta (CA)

( * ) Notice: Subject to any disclaimer, the term of this patent is extended or adjusted under 35 U.S.C. 154(b) by 533 days.

This patent is subject to a terminal disclaimer.

(21) Appl. No.: 13/074,265

(22) Filed: Mar. 29, 2011

(65) Prior Publication Data

US 2012/0048715 A1    Mar. 1, 2012

Related U.S. Application Data

(60) Provisional application No. 61/376,301, filed on Aug. 24, 2010.

(51) Int. Cl.
| | |
|---|---|
| *B01D 1/30* | (2006.01) |
| *B01D 3/42* | (2006.01) |
| *C02F 1/04* | (2006.01) |
| *B01D 1/00* | (2006.01) |

(52) U.S. Cl.
CPC ............... *B01D 1/0082* (2013.01); *B01D 3/42* (2013.01); *Y10S 159/901* (2013.01); *Y10S 203/18* (2013.01); *C02F 1/048* (2013.01)

(58) Field of Classification Search
CPC ...... B01D 1/0047; B01D 1/0082; B01D 1/06; B01D 1/08; B01D 3/42; B01D 1/2896; C02F 1/04; C02F 1/048; C02F 11/12; C02F 2209/001; C02F 2209/003; C02F 2209/055; C02F 2209/06; C02F 2209/07; C02F 2209/19; C02F 2209/40; C02F 2209/42; C02F 2301/046; E02B 15/04; G05D 9/00; Y10S 159/901; Y10S 202/00; Y10S 203/18; Y10S 210/923

See application file for complete search history.

(56) References Cited

U.S. PATENT DOCUMENTS

| | | | |
|---|---|---|---|
| 1,617,082 A | | 2/1927 | Price |
| 2,310,649 A | | 2/1943 | Peebles |
| 2,920,039 A | | 1/1960 | Miller |
| 3,155,600 A | * | 11/1964 | Williamson ..................... 203/11 |
| 3,778,969 A | | 12/1973 | Sudduth |
| 3,819,054 A | * | 6/1974 | Long et al. ................. 210/195.3 |
| 4,002,538 A | | 1/1977 | Pottharst, Jr. |
| 4,007,921 A | | 2/1977 | Zingg |
| 4,269,776 A | | 5/1981 | Keunecke et al. |
| 4,428,328 A | * | 1/1984 | Ratliff ........................... 122/396 |
| 4,683,025 A | | 7/1987 | Flores |

(Continued)

FOREIGN PATENT DOCUMENTS

| | | |
|---|---|---|
| CA | 2 547 503 A1 | 6/2005 |
| CA | 2 609 859 A1 | 5/2009 |

(Continued)

*Primary Examiner* — Virginia Manoharan
(74) *Attorney, Agent, or Firm* — Fay Sharpe LLP

(57) ABSTRACT

A contaminant control system for an evaporative water purification process as deployed in a steam assisted gravity drainage process facility for in situ heavy oil recovery, The contaminant control system is specifically designed to simultaneously control silica, hardness and oil contaminant present in the evaporator feed water to prevent fouling of heat exchange surfaces and improve system reliability and can be applied to many evaporator designs available on the market.

6 Claims, 16 Drawing Sheets

(56) References Cited

U.S. PATENT DOCUMENTS

| | | | |
|---|---|---|---|
| 4,880,533 A | 11/1989 | Hondulas | |
| 4,924,936 A | 5/1990 | McKown | |
| 4,938,876 A | 7/1990 | Ohsol | |
| 5,195,587 A | 3/1993 | Webb | |
| 5,221,439 A | 6/1993 | Li et al. | |
| 5,236,605 A * | 8/1993 | Warncke | 210/799 |
| 5,303,725 A * | 4/1994 | Hilgren | 134/56 R |
| 5,415,673 A | 5/1995 | Hilton et al. | |
| 5,516,119 A | 5/1996 | Trackwell et al. | |
| 5,762,416 A | 6/1998 | LeSire | |
| 5,906,714 A * | 5/1999 | Gramkow et al. | 203/2 |
| 5,948,242 A | 9/1999 | Ohsol et al. | |
| 6,019,818 A * | 2/2000 | Knapp | 95/187 |
| 6,199,834 B1 | 3/2001 | Popov et al. | |
| 6,224,716 B1 * | 5/2001 | Yoder | 202/160 |
| 6,234,760 B1 | 5/2001 | Popov et al. | |
| 6,244,098 B1 * | 6/2001 | Chen et al. | 73/40 |
| 6,258,215 B1 * | 7/2001 | Samsonov et al. | 202/176 |
| 6,315,000 B1 | 11/2001 | Goodyear | |
| 6,418,957 B1 | 7/2002 | Goodyear | |
| 6,536,523 B1 | 3/2003 | Kresnyak et al. | |
| 6,938,583 B2 * | 9/2005 | Wood | 122/414 |
| 7,306,057 B2 * | 12/2007 | Strong et al. | 175/66 |
| 7,326,285 B2 | 2/2008 | Chowdhury | |
| 7,591,309 B2 | 9/2009 | Minnich et al. | |
| 7,647,976 B2 | 1/2010 | Tsilevich | |
| 7,670,573 B2 | 3/2010 | Stell et al. | |
| 7,681,643 B2 | 3/2010 | Heins | |
| 7,814,933 B2 | 10/2010 | Khang et al. | |
| 2002/0043289 A1 | 4/2002 | Goodyear | |
| 2002/0088703 A1 | 7/2002 | Walker | |
| 2002/0184784 A1 | 12/2002 | Strzala | |
| 2005/0098425 A1 * | 5/2005 | Westcott | 203/2 |
| 2007/0007172 A1 | 1/2007 | Strack et al. | |
| 2007/0051513 A1 | 3/2007 | Heins | |
| 2008/0093264 A1 | 4/2008 | Sarkar et al. | |
| 2008/0110630 A1 | 5/2008 | Minnich et al. | |
| 2009/0008334 A1 * | 1/2009 | Schoen et al. | 210/666 |
| 2009/0020456 A1 | 1/2009 | Tsangaris et al. | |
| 2009/0084707 A1 | 4/2009 | Gil | |
| 2010/0058771 A1 | 3/2010 | Gil et al. | |
| 2010/0181184 A1 * | 7/2010 | Bahr | 203/2 |
| 2011/0036308 A1 | 2/2011 | Betzer-Zilevitch | |
| 2011/0061816 A1 | 3/2011 | Duesel, Jr. et al. | |
| 2011/0089013 A1 | 4/2011 | Sakurai et al. | |
| 2012/0000642 A1 | 1/2012 | Betzer Tsilevich | |
| 2012/0179624 A1 | 7/2012 | Berry et al. | |
| 2012/0192716 A1 | 8/2012 | Chen et al. | |
| 2013/0240442 A1 * | 9/2013 | Chidambaran et al. | 210/638 |

FOREIGN PATENT DOCUMENTS

| | | |
|---|---|---|
| CA | 2 610 052 A1 | 5/2009 |
| WO | WO 2005/054746 A2 | 6/2005 |
| WO | WO 2008/098242 A2 | 8/2008 |

* cited by examiner

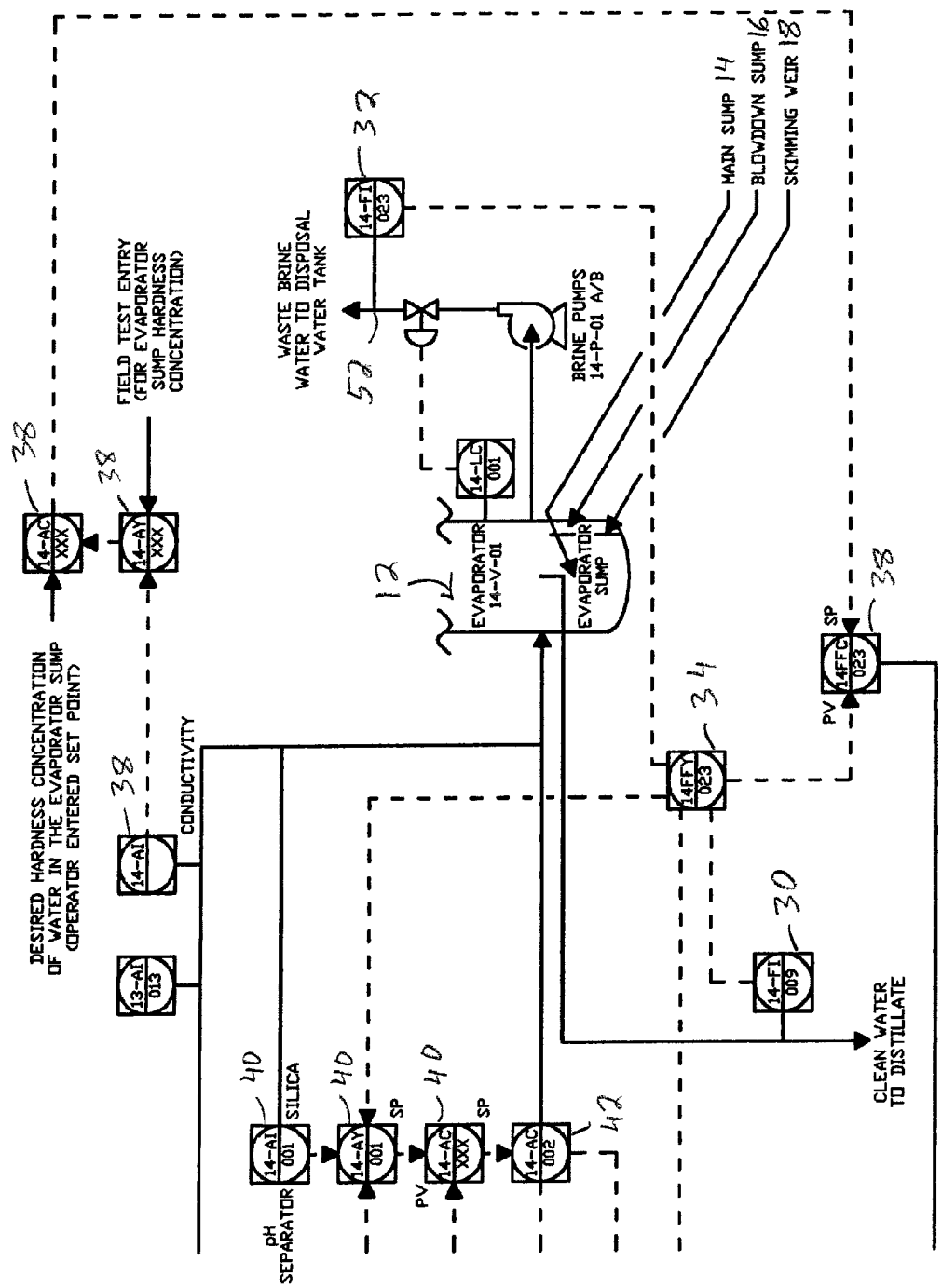

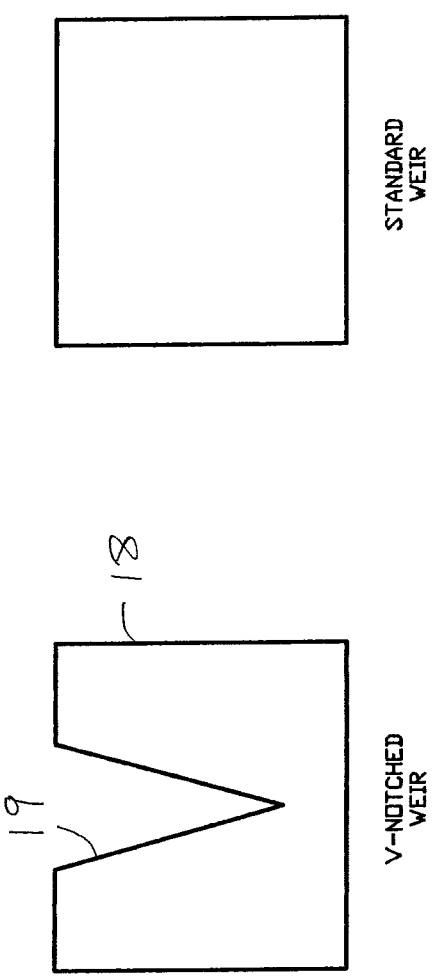

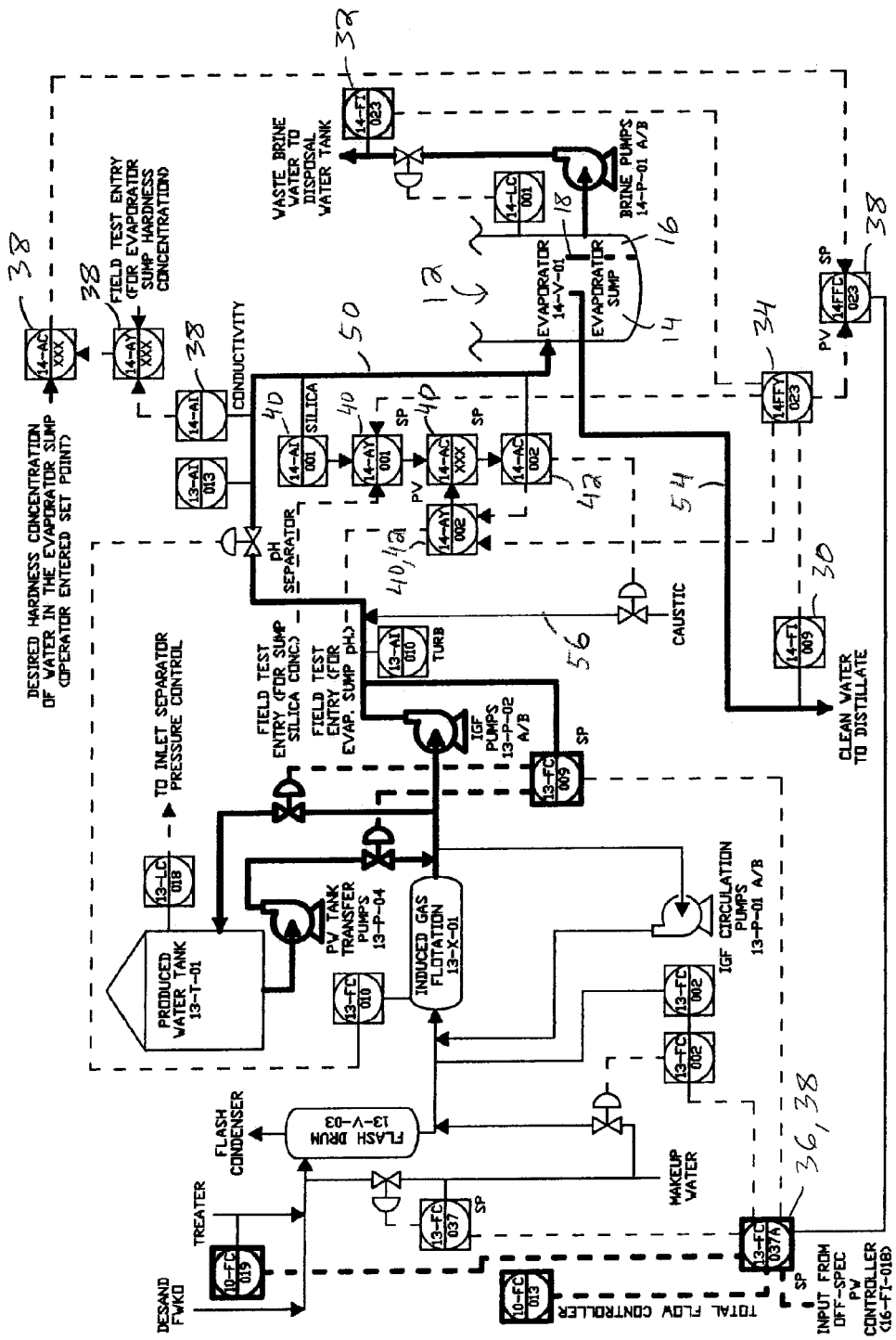

CONTAMINANT CONTROL SYSTEM IN AN EVAPORATIVE WATER TREATING SYSTEM

This application claims the benefit of Provisional Application Ser. No. 61/376,301 which was filed on Aug. 24, 2010. The entire content of that application is incorporated hereinto by reference.

FIELD OF THE INVENTION

Recently, evaporators have been adopted as an alternate water treatment in the heavy oil industry to treat produced water from a Steam Assisted Gravity Drainage ("SAGD") facility. This invention introduces means of controlling contaminants in water that are introduced through and/or are specific to the SAGD process.

BACKGROUND OF THE INVENTION

Water is used in many industrial processes for a variety of applications such as steam production, cooling, washing, diluting, scrubbing, etc. In oil recovery processes, increased efforts have been made to conserve water by maximizing the reuse of process water and hence reducing the amount of waste water being discharged as well as fresh water make-up, resulting in both economical and environmental benefits. However, re-using process water has its own challenges since generally the process water is contaminated in its initial use and requires additional treatment such as filtration, sedimentation, flocculation, evaporation or chemical treatment before it can be re-used. Treatment of the process water for re-use must in itself be efficient and economical, and its extent determined by its intended use.

One such treatment method is termed mechanical vapor compression (MVC) evaporation. A compressor is utilized to produce the pressure and temperature differential to drive the falling film exchanger to produce a high purity distilled water product and a concentrated brine product. The schematic in FIG. 14 depicts a typical prior art MVC Evaporator System.

Evaporators have been used extensively in the mining as well as the pulp and paper industry as means of concentrating solids into a brine and/or recovering water from waste streams. In these applications, the solid contaminants are generally soluble in water. However, the SAGD process, as a result of injecting steam into an underground reservoir that is recovered as hot water with the production fluids, can introduce contaminants in different concentrations or that are not normally present. Oil and water-soluble solids present in the reservoir may cause variances in produced water quality at any given time, which can lead to operating problems in standard evaporator designs.

In the SAGD industry, the produced water, recovered from the SAGD production fluids, and make-up water, added to account for losses, must be treated to remove various contaminants to meet boiler feed water specifications. The contaminants include water hardness, silica, minerals, and residual oil/bitumen. If the water hardness, silica, and minerals are not removed from the water prior to steam generation via a boiler, they will precipitate in the boiler causing reduced heat transfer, lower capacities, higher boiler tube temperatures, extended boiler outages for cleaning and repairs and ultimately failure of the boiler. If the residual oil/bitumen is not removed from the water prior to steam generation via the boiler, there will be foaming and fouling issues in the boiler drum and tubes, again leading to process upsets and shutdowns.

The majority of SAGD production facilities utilize hot or warm lime softening systems combined with Weak Acid Cation ("WAC") ion exchange systems to treat produced and make-up water. However, this process does not produce a high quality boiler feed water and necessitates the use of Once Through Steam Generators ("OTSG"), which only partially boil the feed water (75-80%) to prevent scale deposition (by maintaining solids in solution in the un-boiled water). This leads to energy inefficiency and excessive water disposal rates. OTSGs are custom built for the oil sands industry making them very costly compared to conventional boilers.

Recently, some SAGD operators have adopted falling film evaporators that produce a high quality distilled water for boiler feed water, which has made it possible to shift to more conventional drum boilers. The combination of falling film evaporators and drum boilers results in much higher water recycle rates ("WRR") in a SAGD facility. This is becoming an increasingly critical environmental consideration.

However, operating companies are finding that there are many shortcomings with the current industry practice and evaporator system designs in SAGD facilities. Improvements to the current state of falling film evaporator design for SAGD water treatment have focused on the five most problematic technical issues that have been observed in the field:

Prevent accumulation of hydrocarbons in the evaporator sump;

Ensure silica, calcium, and other water soluble contaminants are maintained in solution to prevent scaling on the evaporator heat transfer tubes;

Select materials of construction suitable to the environment, such as high levels of chlorides in the evaporator sump due to the use of non-potable saline make-up water, pH levels in the sump, or the need to concentrate the brine to maximize water recycling;

Minimize power consumption in a water treatment unit where all of the recovered water is evaporated and re-condensed; and Minimize the possibility of liquid carryover into the compressors of designs with mechanical vapor compression.

Control of Hydrocarbon Accumulation

One unique shortcoming not addressed by the current designs is the tendency of residual oil (including hydrocarbons, heavy oil and SAGD emulsifiers/reverse emulsifiers) to accumulate in the evaporator sump. The typical designs withdraw a concentrated brine stream from the evaporator sump at the outlet of the evaporator recirculation pumps. Owing to its lower density, oil will tend to slowly build up on the surface of the water in the evaporator sump. To control accumulation of contaminants in the evaporator sump, a controlled volume of water is removed from the system at the discharge of the brine circulation pumps. However, oil that accumulates on the surface of the water in the evaporator sump cannot enter the brine recirculation pumps, since the pump suction line is drawn from the bottom of the evaporator sump. The accumulation of oil on the surface of the evaporator sump will lead to "foaming" events in the evaporator sump, fouling of heat exchange surfaces, and the need to shutdown the evaporator sump to withdraw accumulated oil. The need to shutdown the evaporator to deal with foaming events reduces the overall reliability of the SAGD plant and reduces the production volumes. One objective of the invention is to remove the oil that accumulates on the surface of the evaporator sump, on a continuous basis, to prevent the foaming effect.

Control of Water Soluble Contaminants

The operation of the evaporator is time and labor consuming and has to be highly controlled before, after, and during the operation. A typical control scheme for an evaporator consists of the following:

- The blow-down flow set-point is changed by an operator in response to a lab analysis of the concentration of solutes in the evaporator sump, so the concentration of solutes (silica, chloride, etc.) is controlled manually;
- The evaporator feed rate is adjusted automatically by a sump level controller in response to changes in sump level;
- The compressor speed and/or guide vane position is adjusted in response to the level of water in the distillate tank;
- The production rate of distillate water from the evaporator is changed slowly in response to the level of the downstream tank, and in extremes, the production rate is changed in response to the level of the feed tank;
- Startup and shutdown of the evaporator is done manually significant time pressures on the operator, the mode changes, especially startups and the response time immediately after a trip/malfunction, are the most dangerous times in a process plant; and
- Operators make manual adjustments to rates to manage the inventories in 1) the upstream produced water tank that feeds the evaporator and 2) the downstream boiler feedwater tank that holds the evaporator product distillate water.

An objective of this invention is to provide a process control scheme that provides system control across a broad range of operating conditions with minimal need for operator intervention. The typical prior art control scheme requires significant operator intervention, both during changes in operating mode (startup, shutdown, etc.) and periodically during operation, with manual adjustments to both feed flow and blowdown flow. Improved control will reduce the staffing requirements without affecting risk or operating costs, and in fact can simultaneously reduce risk and staffing costs and increase operating efficiency.

Automatic control of sump composition allows the evaporator to maximize efficiency of water use or power, depending on which is the most effective constraint.

Yet another objective of the invention is to remove the oil that accumulates on the surface of the sump on a continuous basis to prevent the foaming effect.

Another objective of this invention is the coordinated control of the different processing units, which will eliminate the need for online surge tanks, yielding a reduction in capital and operating costs compared to other processes.

Another objective of this invention is to reduce risk of damage, injury, production loss, or environmental incident by reducing the operator workload at the most critical time.

Further and other objects of the invention will become apparent to one skilled in the art when considering the following summary of the invention and the more detailed description of the preferred embodiments illustrated herein.

SUMMARY OF THE INVENTION

The control schemes and equipment designs included in this invention can be readily adapted to a variety of MVC Evaporator designs available on the market. The invention is specifically designed to improve performance of MVC Evaporator technology in a SAGD process facility.

According to one aspect, there is provided a solution for foaming comprising removing the oil that accumulates on the surface of the sump on a continuous basis. In one embodiment, to achieve this, the brine removal point is moved from the outlet of the brine recirculation pumps to a blowdown sump incorporated into the evaporator sump. A vertical partition plate, or weir, is added to the bottom sump section of the evaporator separating it into an evaporator or main sump and a smaller blowdown sump. This results in the ability to continuously remove oil from the evaporator via the blowdown sump and thus prevent foaming events.

According to one aspect of the invention, there is provided a water purification process in a steam assisted gravity drainage system for a heavy oil recovery facility, the process comprising an evaporator and a set of controllers. The evaporator having a bottom with a sump provided at the bottom thereof and including an oil skimming weir dividing the sump into a main sump and a blowdown sump, wherein the water containing impurities flows over the weir from the main sump to the blowdown sump. In a normal operation mode, the evaporator receives water from the process and discharges distilled water while discharging waste brine from the blowdown sump.

According to yet another aspect of the invention, the weir separating the main sump and the blowdown sump has a v-notch at the top of the weir to allow variations in the main sump level, within the height of the v-notch, with varying but continuous flow of brine to the blowdown sump. The location of the weir, preferably a v-notched weir, in the evaporator is such that any hydrocarbon floating on top of the water in the main sump will be continuously removed from the evaporator with the waste brine, resulting in elimination of the hydrocarbon related foaming event and unit shutdowns associated with foaming events.

Preferably, the set of controllers includes:
- a distilled water flow meter provided at the discharge of the evaporator;
- a blowdown flow meter measuring the flow from the blowdown pump discharge;
- a cycle calculator for calculating the ratio between the distilled water flow and blowdown flow; and
- a total flow controller.

In this case, the cycle calculator provides a set point to the total flow controller, thus the flow of the water into the evaporator does not directly depend on the level of the liquid in the main sump. Further the operation of the evaporator functions in a contained closed loop environment.

According to another aspect of the invention, the process includes a distillate tank for receiving and dispensing distilled water, the distillate tank having a level controller for controlling distilled water production. This distillate tank is the only major surge capacity in the process.

According to still another aspect of the invention, the set of controllers further comprises a hardness controller, a silica controller, and a pH controller. The hardness controller manipulates the set point of the cycle controller affecting the flow of make-up water into the process to maintain a target hardness concentration in the evaporator sump and is adjusted to account for variations in hardness concentration in the evaporator feed. The pH controller adjusts the flow of caustic to the evaporator feed to achieve the target pH specification. The target pH specification is calculated based on the silica concentration in the controller, which determines the set point for the pH controller and is adjusted to account for the concentration in the sump due to removal of distillate. The objective is to keep the sump pH at a level that provides a safe margin from the point where silica will precipitate from solution. FIG. 13 illustrates the dependence of silica solubility on pH.

Preferably the evaporator receives upstream water from a de-oiling or Inert Gas Floatation (IGF) unit, wherein the flow of make-up water is set providing the desired flow into and out of the IGF unit.

According to yet another aspect of the invention, besides the normal mode of operation, the evaporator has two additional modes of operation:

1) an idle mode; and
2) a recycle mode.

During the idle mode, there is no flow in or out of the evaporator, and during the recycle mode, the distilled water is recycled to the inlet of the evaporator with these modes being initiated when starting up the evaporator, when shutting down the evaporator, when there is a loss of flow, and in response to a malfunction in the system, such as a compressor malfunction, a pump malfunction or a boiler malfunction. The evaporator may be operated in said modes automatically or be initiated by an operator.

Preferably, the recycle mode is used during a shut down procedure and after a malfunction, such as a boiler malfunction, and the idle mode is used after a compressor malfunction.

According to still another aspect of the invention the start up of the system includes the following steps; when shut down, the system is switched first to idle mode, then to recycle mode and finally to normal operation mode. This way the careful selection of modes reduces operating risks to the system and to personnel while providing a smooth operation of the evaporator, when compared to single mode evaporators.

According to still another aspect of the invention the system presented above can be is installed in a modular portable/mobile SAGD system for heavy oil recovery.

Direct manipulation of the water balance by the cycles controller is unique. It provides rapid integral control of the water purification area of the plant. Conventional mass-balance control would result in more level fluctuations and would reduce the overall response time of the process.

Recycle mode is new and unique. It reduces operating risk during startups, shutdowns and after a trip. After a significant even elsewhere in the plant, such as a boiler trip, the evaporator can be placed in recycle mode. Following a compressor trip the evaporator can be placed into hot idle mode. Similarly, a startup would take the evaporator from shutdown to hot idle, then to recycle, then to normal operation. These intermediate modes reduce the time pressures on the operator and allow for smoother startups.

BRIEF DESCRIPTION OF THE DRAWINGS

FIG. 1A is a schematic view of the evaporator.

FIG. 1B is a schematic view of a weir with v-notch and without v-notch.

FIG. 2 is a scheme for the evaporator sump level control.

DETAILED DESCRIPTION OF THE DRAWINGS

Figure 1:
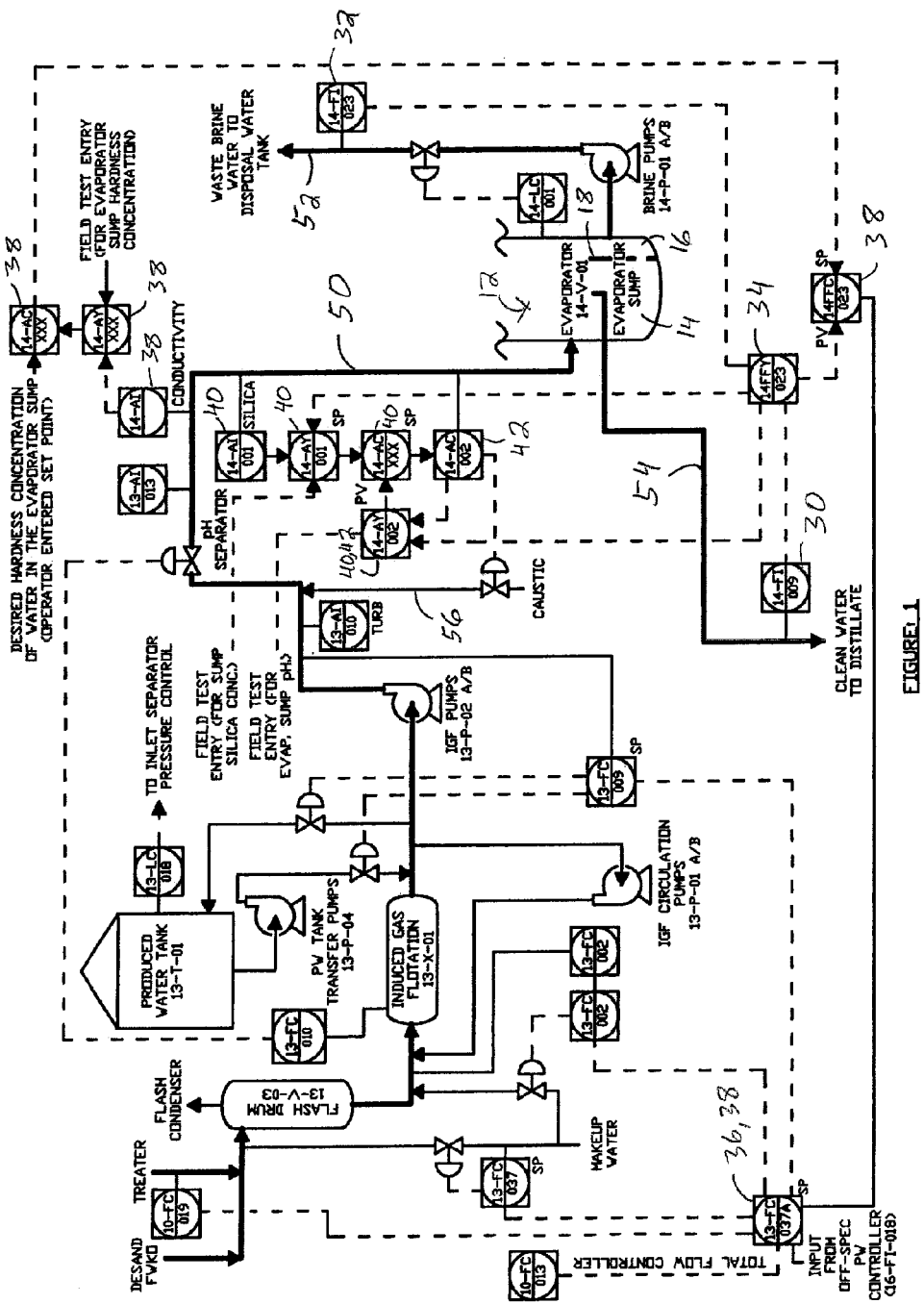
FIG. 1 is a schematic flow diagram of the water in the water treatment unit.

As discussed above, a solution to the oil foaming event in the evaporator sump 14 is to remove, on a continuous basis, the oil that accumulates on the surface of the sump. To achieve this, the brine removal point is moved from the outlet of the brine recirculation pumps to a blowdown sump 16 incorporated into the evaporator sump 14, as best seen in FIG. 1A. A vertical partition plate, or weir 18, is added to the bottom surge section of the evaporator, separating it into an evaporator or main sump 14 and a smaller blowdown sump 16.

Preferably, the weir 18 also has a v-notch cutout 19 as best seen in FIG. 1B. The purpose of the weir is to have flow of brine and oil skim continually overflow from the main sump 14 to the blowdown sump 16. The v-notch cutout 19 on the weir 18 provides smoother control of the blowdown sump level, as the overflow rate will vary as level moves up and down the V-notch; the level in the main sump 14 can vary slightly while maintaining flow to the blowdown sump 16.

The continuous removal of oil will prevent "foaming" events in the evaporator 10. When oil accumulates on the surface of the sump, it acts like a surfactant and can lead to hydrocarbon fouling of the heat exchanger tubes (visible in FIG. 5, for example) or foaming on the water surface. Foaming increases the potential for carry over of liquid droplets into the evaporator vapor compressor suction, and this could trip or damage the vapor compressor. When foaming occurs, operators will add extra antifoam chemicals. However, this is at best a temporary fix, and eventually the evaporator must be shutdown in order to remove the accumulated oil and/or be cleaned. A regular need to shutdown the evaporator reduces the reliability of the SAGD facility and reduces production volumes. By implementing a continuous overflow of oil and brine to the blowdown sump, the current design will prevent a build-up of oil in the main sump. The continuous overflow will deal with oil that accumulates slowly over time resulting from the small amount of residual oil in the evaporator feed. It will also deal immediately with larger amounts of oil in the evaporator feed that may be present when there are upsets in the upstream produced water de-oiling system.

As noted above, the current design adds a vertical partition plate or weir 18, as illustrated in FIG. 1A, to the bottom surge section of the evaporator, separating it into an evaporator or main sump 14 and a smaller blowdown sump 16. Oil that accumulates on the surface of the main sump 14 continuously overflows into the blowdown sump 16 and is removed from the system as part of the blowdown stream. The main sump level is not controlled at a fixed point and "floats" slightly within the range of the v-notch height based on the evaporator inlet and brine outlet flows. The blowdown sump level is controlled very tightly so as to provide direct indication of flow from the main evaporator sump 14 into the blowdown sump 16.

Figure 5:
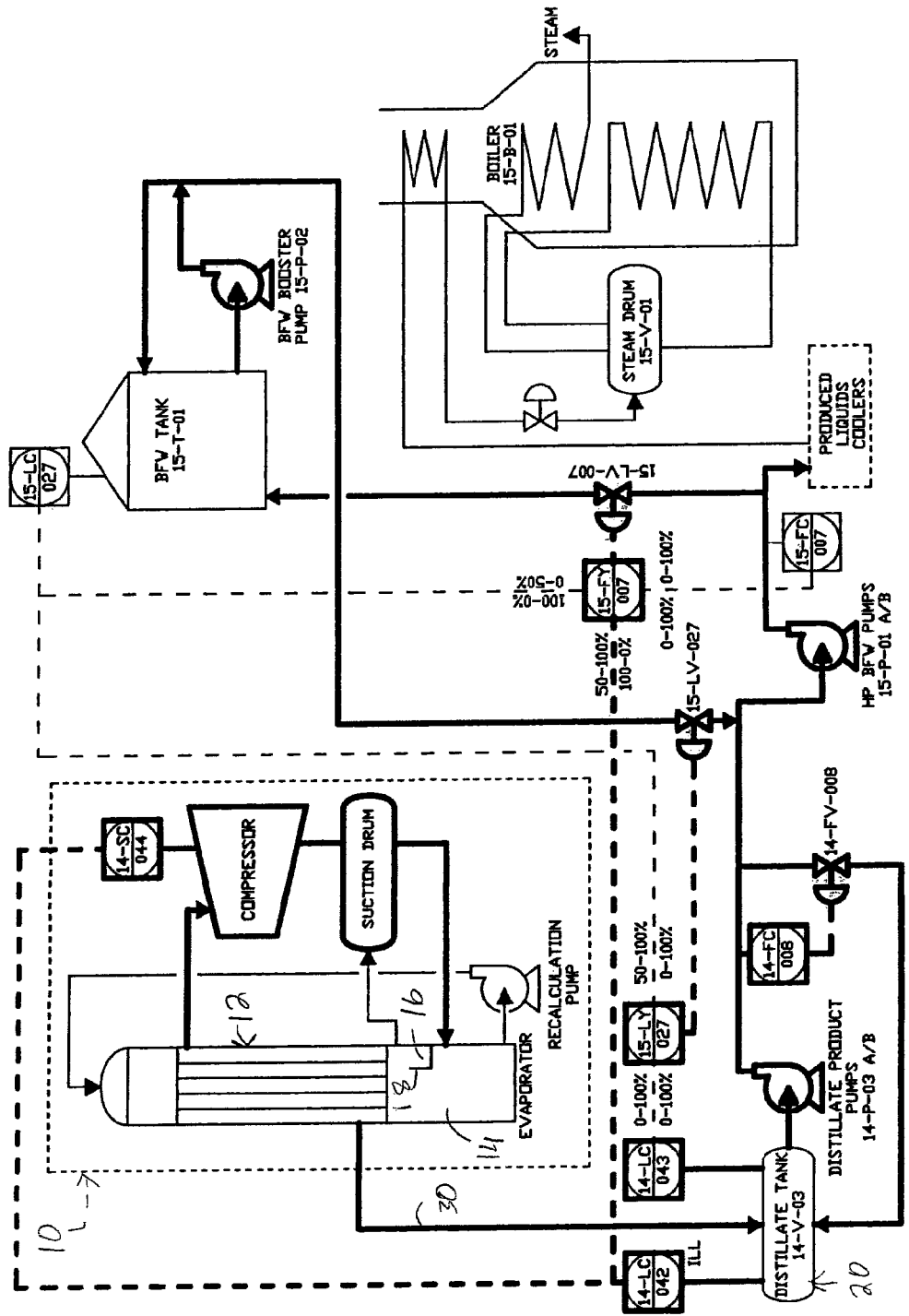
FIG. 5 is a scheme for distillate tank level control.
Figure 6:
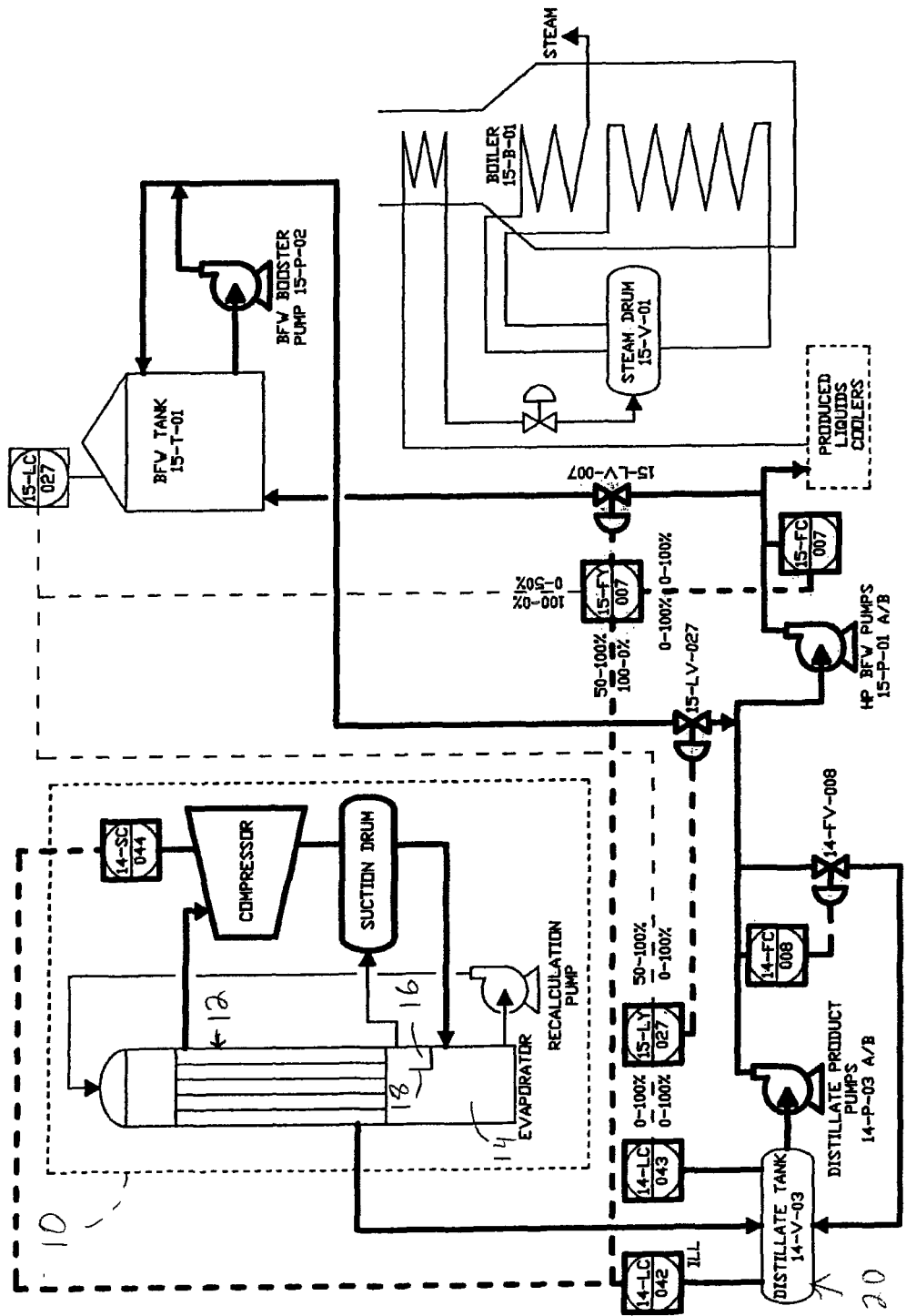
FIG. 6 is a scheme for boiler feed water tank level control.
Figure 7:
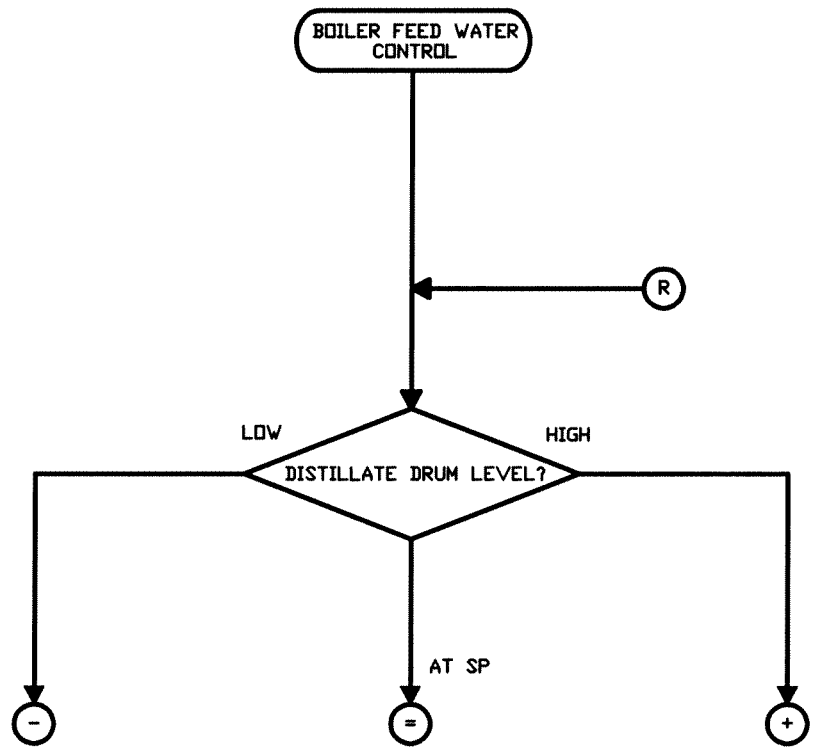
FIGS. 7-10 are logic diagrams for boiler feed water control.
Figure 8:
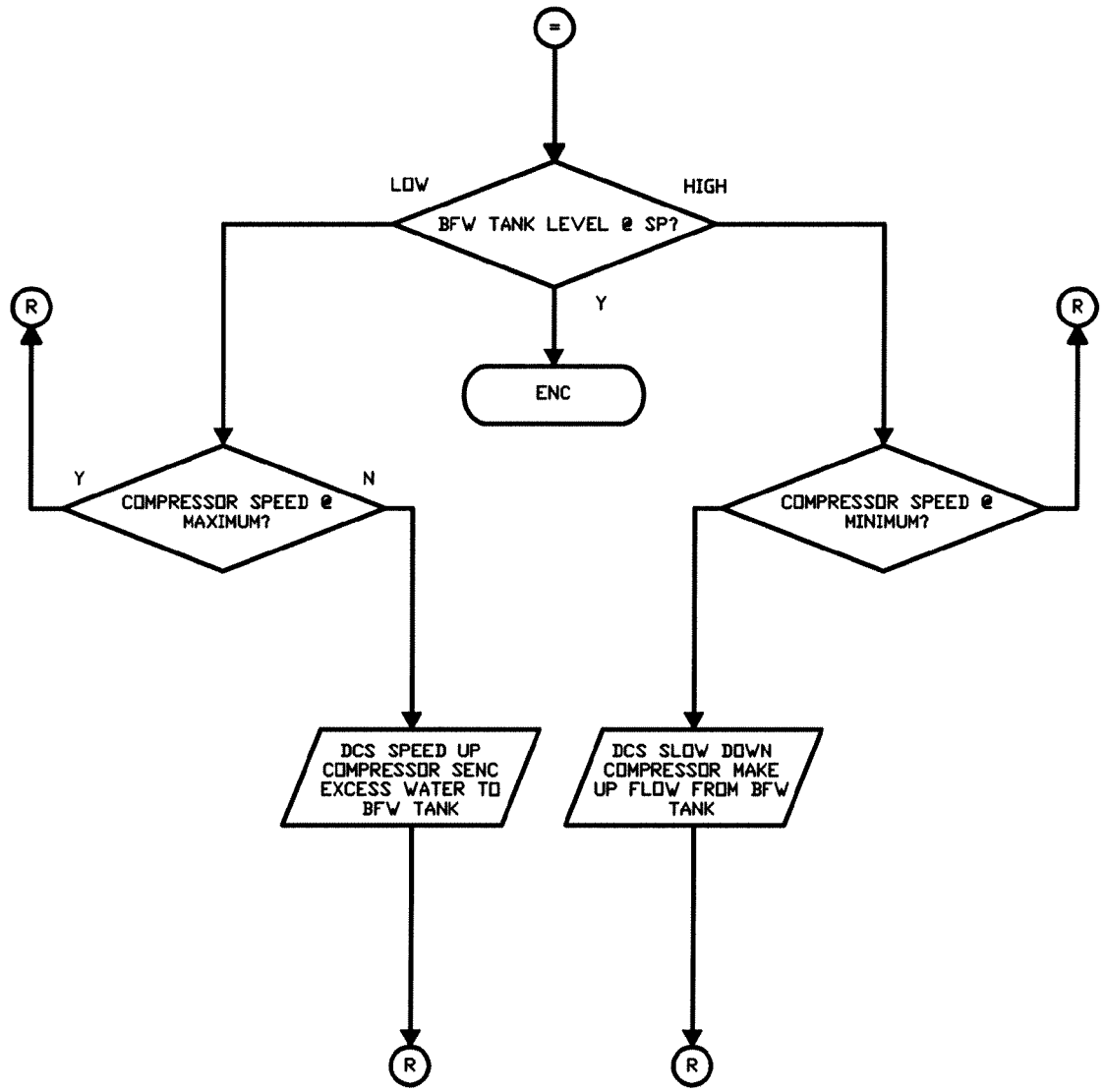
Figure 9:
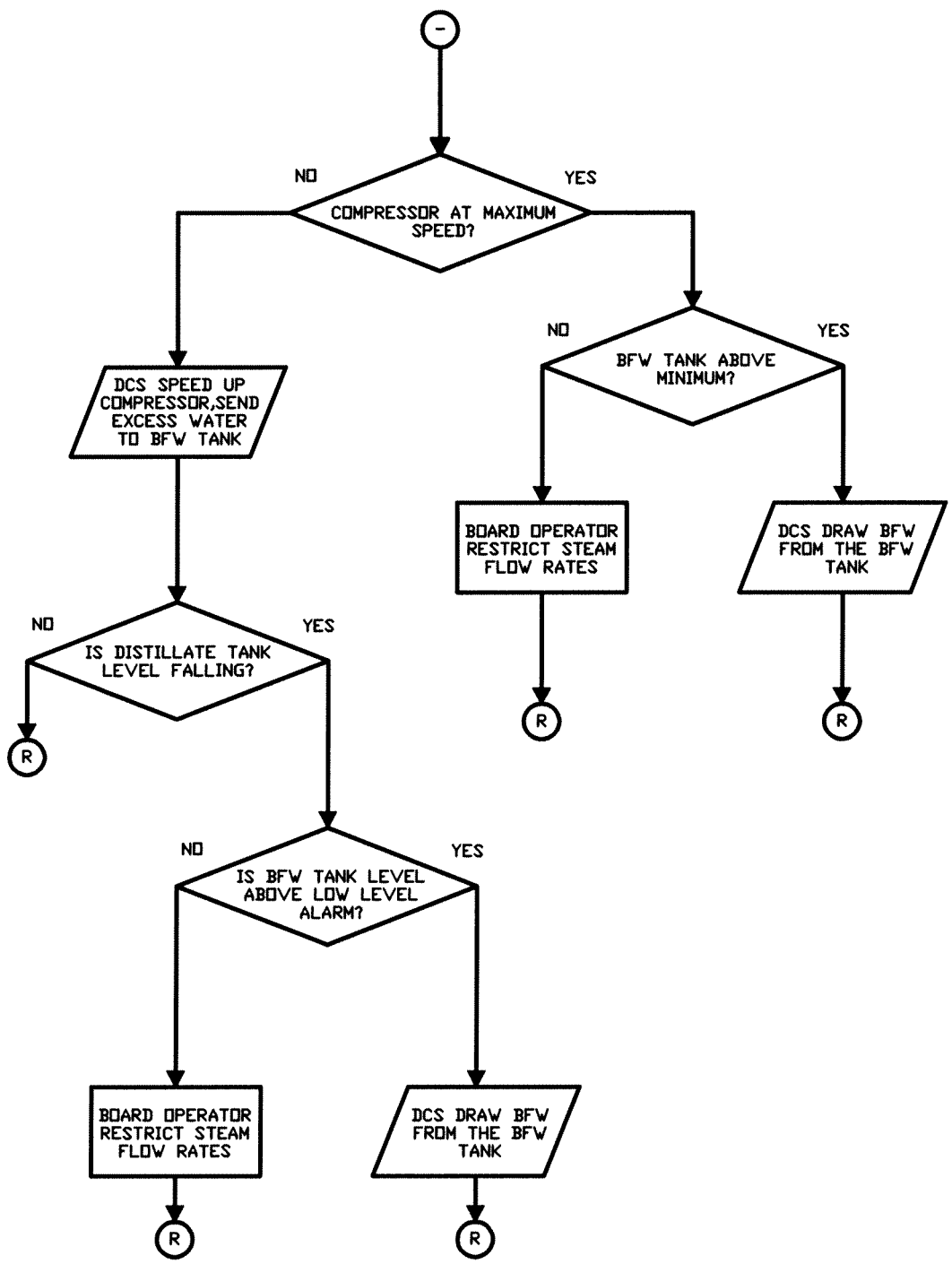
Figure 10:
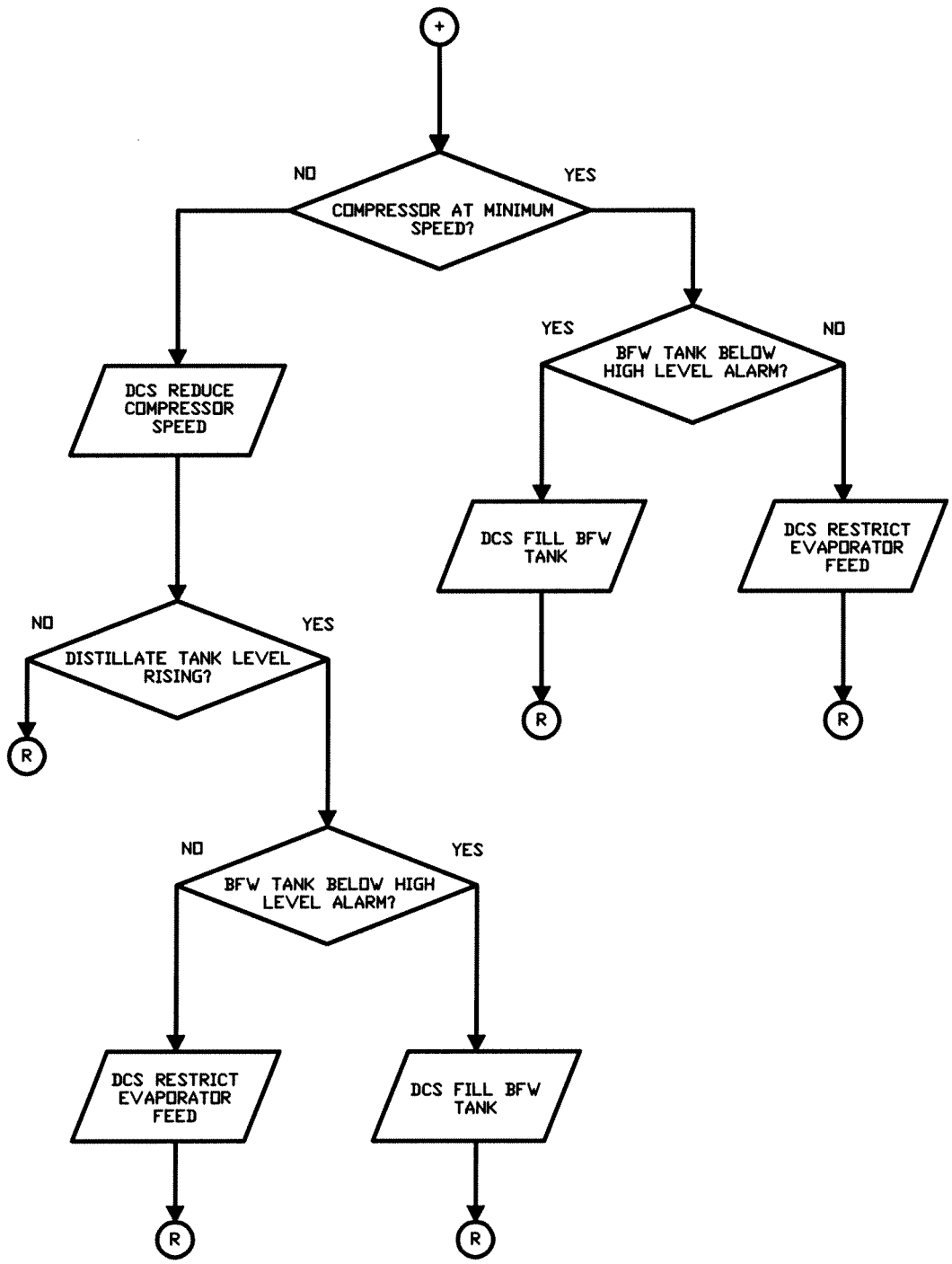

Evaporator Controllers:

As best seen in FIGS. 5 and 6, control of the evaporation rate is relatively conventional. The distillate tank level controller (14-LC-042) 50 manipulates the compressor duty. The distillate tank level is the major surge capacity in the process and so must be managed carefully to provide maximum damping between the evaporator 10 and boiler(s). The level controller will not be a conventional PID algorithm but will be a nonlinear controller with rate limiting. Feed control is unconventional. The evaporator sump level does not directly manipulate feed rate. In fact, the sump is not controlled directly or even necessarily measured. Instead, the evaporator sump level is the result of the control scheme described below (as best seen in FIG. 2). The blowdown sump level is controlled very tightly. This provides direct indication of flow 32 from the main evaporator sump 16 into the blowdown sump 18.

The flow of distillate 32 to the distillate tank 20 is also measured (as best seen in FIGS. 5 and 6) through 14-FC-008. These two flows allow for direct calculation of evaporator cycles 34, which is the ratio of the distillate flow to the blowdown flow. The sump level can be inferred indirectly from the blowdown flow, since the flow into the blowdown sump 16 from the main sump 14 is a function of the main sump level.

The calculation of evaporator cycles 34 is used by the soft sensors for sump pH 42, sump silica 40, and sump hardness 38. The soft sensors are corrected by lab results when available. The sump hardness calculation is used by the sump hardness controller to manipulate the set point of the cycles controller. Fewer cycles will result in a lower concentration of hardness in the sump, while more cycles will raise the level of hardness.

Figure 4:
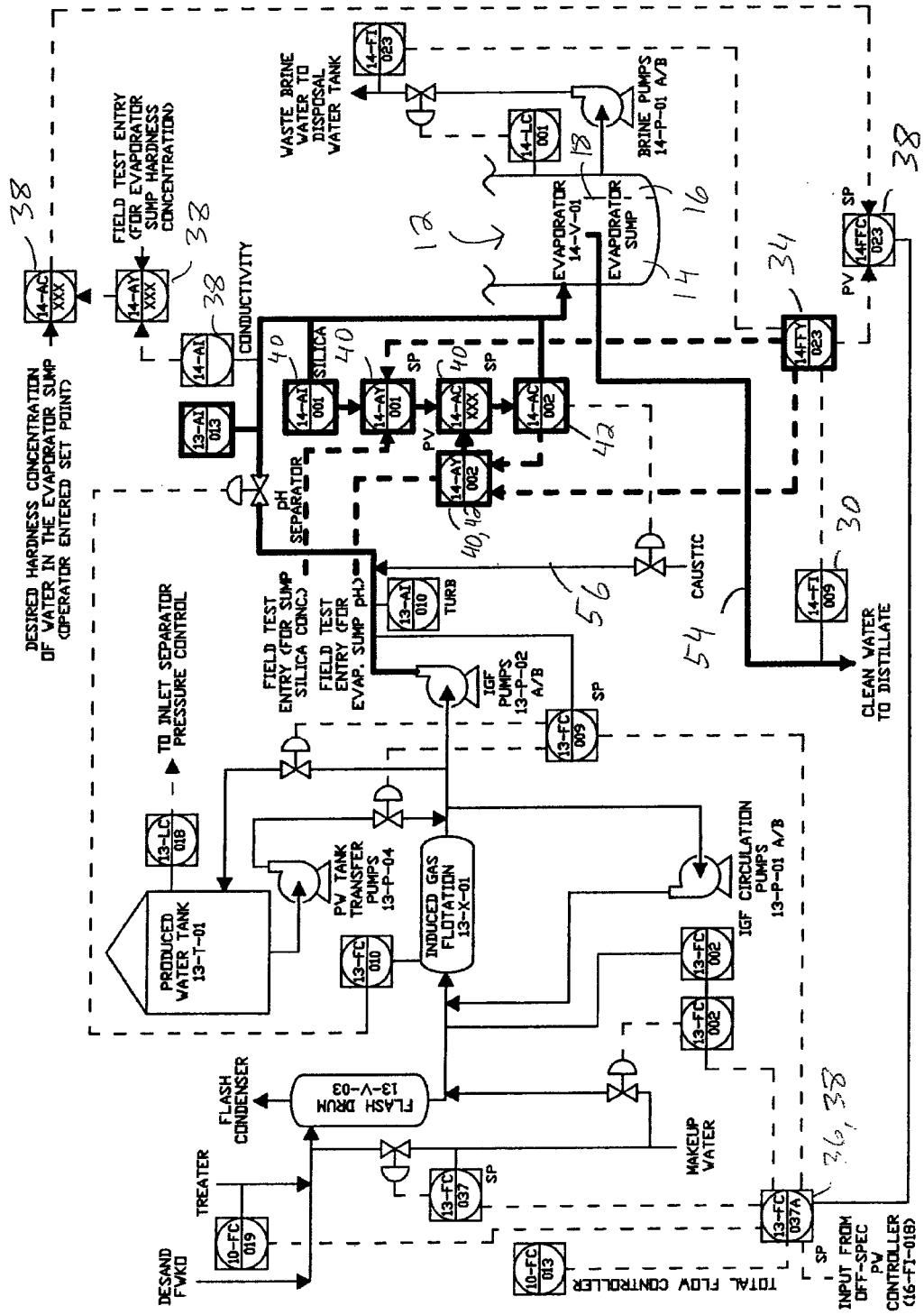
FIG. 4 is a scheme for pH control.

As best seen in FIG. 4, the sump silica concentration 40 will be used to determine the set point of the sump pH controller 42. The sump pH controller will in turn determine the inlet pH controller set point (14-AC-002) 42, which will adjust the flow of caustic to the evaporator sump 14.

The cycles controller will directly manipulate the plant water balance by setting the set point for the total flow into the water purification section of the plant. The total flow controller will adjust the makeup water flow to the upstream IGF directly under normal conditions and, only under upset conditions, will direct water to or from the produced water tank. This configuration eliminates the need for online surge capacity.

The level in the IGF will be controlled very tightly by adjusting the flow into the evaporator. This will effectively pass through the adjustments made by the total flow controller immediately after they are made.

Mode Change

Automated procedures will be defined for starting up, shutting down, responding to compressor trip, brine pump trip, boiler/HRSG trip, and loss of plant feed. While not all steps in the procedure can be automated, many of them will be, and others will be automatically verified by instrumentation to ensure that the operator has performed the appropriate manual steps.

In particular, the evaporator has two operating modes that are between shutdown and normal operation that can be sustained indefinitely. These two modes provide safe parking spots for the evaporator if the operator needs to troubleshoot other aspects of the plant. The two operating modes are hot idle and recycle mode.

Hot Idle Mode

In this mode, flows in and out of the evaporator 10 are shut, the brine is recycled, the compressor is off, and low-pressure steam is added to keep the evaporator 10 hot. Most controls are similarly in standby, largely in automatic, but with flows of zero.

Recycle Mode

In this mode, the evaporator 10 itself operates normally. Feed and blowdown flows are normal, the compressor is running, and distillate is produced. The distillate is recycled from the output of the boiler feed pumps back to the produced water tank. Evaporator feed is drawn from the produced water tank.

The primary benefits of this control scheme are:
a) Reduced operating costs resulting from cooling and re-heating of water flowing through surge tanks;
b) In addition, different aspects of the control scheme have additional benefits;
c) Hot idle and recycle modes of operation result in risk reduction, since there is a reduced operator workload and stress during periods of plant/process upset;
d) Automated procedures result in risk reduction for the same reason;
e) Closed loop control of concentration of solutes in sump results in reliability, on-stream time and operating cost; the plant can run closer to limit consistently without deposition of solids on exchanger; and
f) Direct manipulation of plant water balance results in operability, since the plant will not be water-long or water-short during normal operation. Only during upsets or abnormal operating modes will there be a need for surge capacity. The removal of online surge capacity is unique to this process, and the direct manipulation of the water balance is required for the process to operate at high rates. Without it, there will be continuous fluctuations in the levels and flows in the plant.

Figure 3:
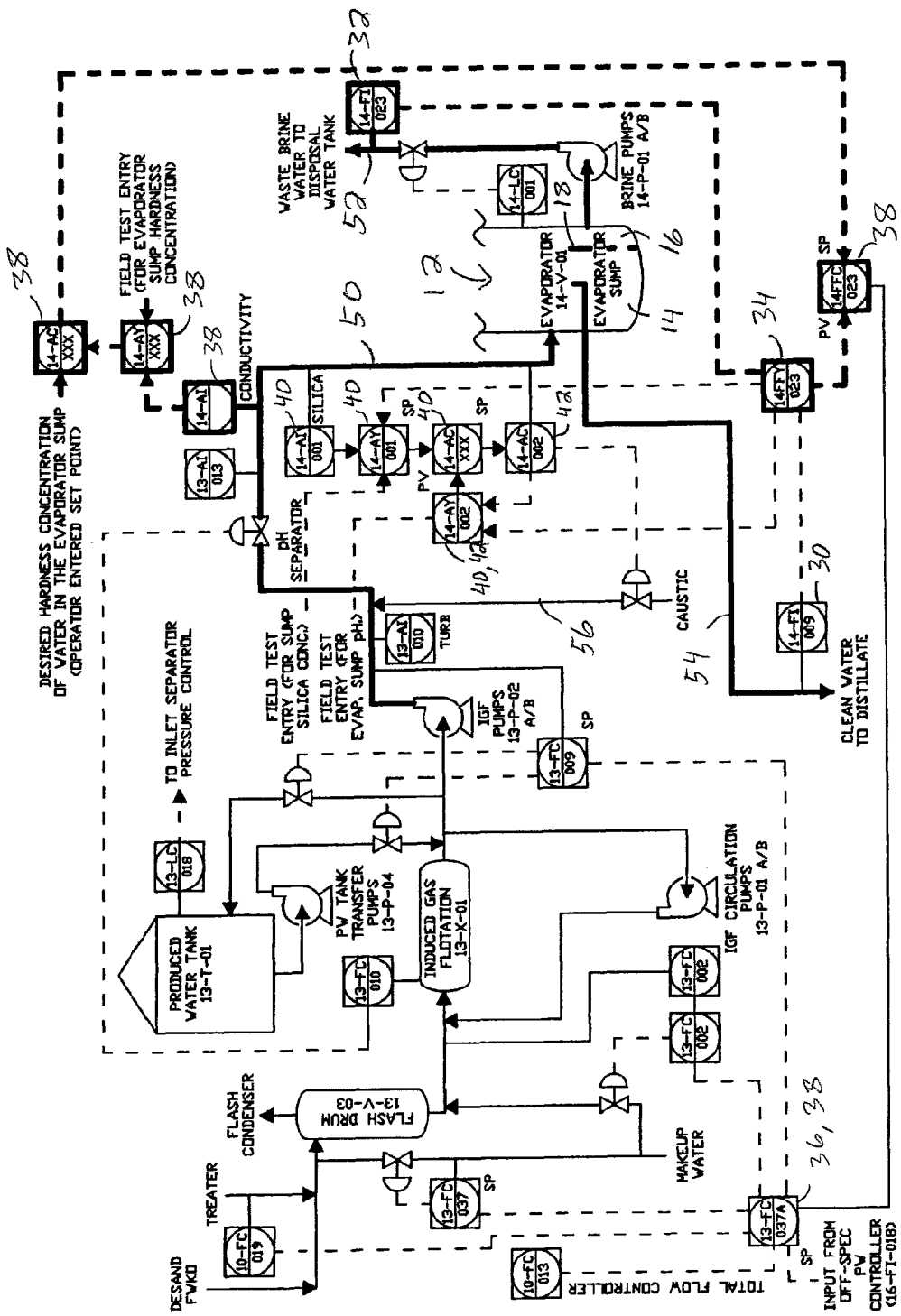
FIG. 3 is a scheme for hardness control.

Control Schemes (FIGS. 2, 3, 4)

This part of the plant receives de-oiled water from the Produced Water De-Oiling section of the plant and fresh make-up water from water wells. The purpose of the Produced Water De-oiling section is to:
a) Add the required amount of makeup water to the process;
b) Reduce the concentration of hydrocarbons in the produced water from 500 ppm to 30 ppm;
c) Provide the required flow rate of feed to the evaporator;
d) Treat produced water (reduce silica, hardness, and hydrocarbon concentrations); and
e) Produce high-purity boiler feed water.

The main equipment:
a) Produced Water Flash Drum, 13-V-03 (preferably CS)
b) Induced Gas Flotation (IGF) Package, 13-X-01 (preferably Wetted Parts: Duplex SS Vessel: CS
c) Produced Water Tank, 13-T-01 (preferably CS)
d) IGF Discharge Pumps, 13-P-02 A/B (Casing: CS Wetted Parts: Duplex SS)
e) PW Tank Transfer Pumps, 13-P-04 (Casing: CS Wetted Parts: Duplex SS)
f) Evaporator Package, (14-X-01) 10, which includes:
g) Inline Feed Mixer, 14-MX-01
h) Evaporator, (14-V-01) 12 preferably made of Duplex SS or AL6XN
i) Brine Circulation Pump, 14-P-01A/B preferably made of Duplex SS or AL6XN
j) Evaporator Vapor Compressor, 14-C-01
k) Distillate Tank (14-V-02) 20
l) Water Treatment Chemicals Package, 14-X-02 (caustic, antifoam, and scale inhibitor)
m) Distillate Product Pumps, 14-P-02 A/B
n) Brine Pumps, 14-P-03 A/B preferably made of Duplex SS or AL6XN
o) Evaporator Blowdown Cooler, 14-E-01
p) Utility Water Cooler, 14-E-02

The intent of this section is to:
a) Provide a high-level process overview of components of the Produced Water De-oiling and Water Treatment systems;
b) Explain how make-up water is added to the system to maintain a constant flow of water to the Induced Gas Flotation unit and Evaporator 10;

c) Explain how feed water and blowdown rates are determined, to maintain a desired concentration of hardness in the Evaporator 10 (which will prevent fouling of the equipment); and d) Explain how pH will be controlled in the Evaporator 10 to keep silica in solution.

The overall objective of this part of the plant is to maintain the plant water balance and maximize the concentration of impurities in the evaporator water. This will minimize the evaporator blowdown flow and water make-up flows but keeps the concentrations below the point at which salts will begin to precipitate out in the evaporator 10 and cooler and cause fouling problems.

There are four main controllers discussed in detail in this narrative:

a) Blowdown Sump Level Control (FIG. 2)—The objective of this control will be to maintain the level in the sump by manipulating the flow of brine leaving the sump;

b) Hardness Control 38 (FIG. 3)—The objective of this control will be to maintain the brine concentration at the correct set point. The correct set point is a point low enough to prevent the precipitation of hardness on the Evaporator internals but high enough to optimize performance of the Evaporator 10. The desired value for the set-point concentration will be determined during detailed engineering and initial operation of the process;

c) Makeup water control (FIGS. 2-4)—The objective of this control will be to maintain a steady flow of water to the IGF and maintain the plant water balance. During abnormal operating conditions, this controller will draw from or push water into the Produced Water Tank 13-T-01;

d) pH Control 42 (FIG. 4)—The objective of this control will be to maintain the Evaporator brine pH at a point high enough to prevent the precipitation of silica on the Evaporator internals.

There are other basic control loops in this section of the plant that will not be discussed.

Produced Water Flash Drum

Produced water from the Desand/FWKO/Treater Vessel enters the Produced Water De-oiling System. This stream mixes with the make-up water from the Make-up Water Pumps (42-P-01/02) and the produced gas liquid from the Dump Condenser (15-E-02). This mixed stream then enters the Produced Water Flash Drum (13-V-03), along with the boiler blowdown from the Package Boiler (15-B-01) and the blowdown from the HRSG Steam Drum (40-V-01).

These streams are flashed at a constant pressure of −5 kPag to cool the stream and ensure no flashing occurs in downstream equipment.

Induced Gas Floatation (IGF)

The liquid stream then enters the IGF Package. The purpose of the IGF Package is to reduce the oil concentration in the produced water from 500 ppm (coming from the Inlet Cooling and Separation system) to 30 ppm (needed for the Water Treatment System). Inlet oil concentrations are expected to fluctuate within the range of 500-1,150 ppm. An inlet oil concentration of 500 ppm will signify normal operation, where an oil concentration of 1,150 ppm will be the design upset case. The IGF works by using micro-bubbles of natural gas to float oil to the top of the chambers in the IGF Vessel 13-X-01, where it is skimmed off and sent to the Skimmed Oil Drum 13-V-02. The skimmed oil is recycled back to the inlet of the Desand/FWKO/Treater Vessel using the Oil/Water Pumps 13-P-03 A/B. De-oiling is done in several consecutive chambers inside the IGF.

If additional sub-cooling is required, there is the ability to add make-up water to the IGF inlet. If make-up water is added to this stream, the equivalent amount of make-up water will be reduced to the feed to the Produced Water Flash Drum to keep the mass balance constant.

Evaporator Feed

The clean, de-oiled water leaving the IGF splits into two streams: the main flow and a 35% recycle stream. The recycle stream is used to provide the source of bubbles for the IGF and is recycled back to the IGF inlet and chambers.

The de-oiled produced water is sent to the IGF Discharge Pumps 13-P-02 A/B. The de-oiled produced water then flows to the evaporator package 14-V-01. The Produced Water Tank (PWT) 13-T-01 is used for surge capacity only during abnormal operating conditions. The signal to transfer water into or out of the PWT will come from the water balance controller. Controls in the PWT will reduce production rates if the level in the tank gets too high.

Evaporator

The evaporator package (14-V-01) 10 processes a feed water stream containing dissolved solids and produces distillate of sufficient quality to be used in the package boiler. The unit also produces a concentrated wastewater stream. Produced water is supplied at the package boundary by the IGF Discharge pumps 13-P-02 A/B. Various chemicals are added to the evaporator feed water.

Caustic (NaOH) is added to control the pH 42 to ensure silica species remain in solution. Caustic is fed from the Caustic Storage Tank 14-T-01 using the Caustic Pumps 14-P-04A/B/C. Antifoam is added to reduce foaming in the evaporator and reduce liquid carryover to the vapour compressor. Antifoam is fed from the Antifoam Tank 14-T-02 using the Antifoam Pumps 14-P-05A/B. Scale inhibitor can be added to minimize scale formation in the Evaporator exchanger 12. Scale inhibitor is stored in the Scale Inhibitor Tank 14-T-03 and fed using the Scale Inhibitor Pumps 14-P-06A/B. The Antifoam and Scale Inhibitor Tanks are expected to be removable totes. An Inline Feed Mixer 14-MX-01 is used to ensure the chemicals are adequately mixed into the feed water.

Feed water is then sent to the Evaporator sump 14. The Brine Circulation Pumps 14-P-01A/B circulate brine from the Evaporator sump 14 to the top of the Evaporator exchanger 12. Brine flows through the tube side of the Evaporator exchanger as a falling film where a small mass fraction is evaporated. The remaining liquid drains back into the sump 14. Vapours that disengage from the falling brine are directed to the Evaporator Vapour Compressor 14-C-01. The Evaporator Vapour Compressor increases the temperature and pressure of the vapour, and will require a Variable Frequency Drive (VFD) motor. The compressed vapour condenses on the shell side of the Evaporator exchanger 12 while vapour is generated from the falling film on the tube side. Distillate from the shell side of the Evaporator exchanger 12 is drained by gravity to the Distillate Tank (14-V-03) 20 (see FIG. 5); distillate will also be used for wash water for mist eliminator. A slip stream of distillate will be cooled to ~48° C. in the Utility Water Cooler 14-E-02 and sent to the utility water header. The temperature will be controlled by a temperature loop that controls the amount of cooling glycol flowing through the exchanger.

Concentrated brine will overflow a weir 18 to the blowdown sump 16. The blowdown material is pumped by the Brine Pumps 14-P-03 A/B through the Evaporator Blowdown Cooler 14-E-01 and transferred to the Disposal Water Tank 43-T-01. A temperature controller will maintain the temperature of the disposal water by regulating the glycol flow through the cooler. The process is designed such that the Evaporator has one hot idle mode and one recycle mode. The hot idle mode involves re-circulating the brine through the Evaporator 10 while the Evaporator Vapor Compressor is not operating. Utility steam is used to offset any heat losses in order to keep the Evaporator 10 warm. Water from the condensed utility steam will go to the Distillate Tank 20. The recycle mode involves producing distillate with the Evaporator Vapor Compressor in operation and routing all of the distillate back to the Evaporator sump 14. Distillate will be routed from the outlet of the HP BFW Pumps 15-P-01 A/B to the Produced Water Tank and back to the sump through the Evaporator feed line. A vent is required from the Produced Water tank and/or the Evaporator Compressor discharge to prevent an increase in Evaporator temperature and pressure. Saline makeup water will be added to compensate for the water lost to the vent stream.

Figure 11:
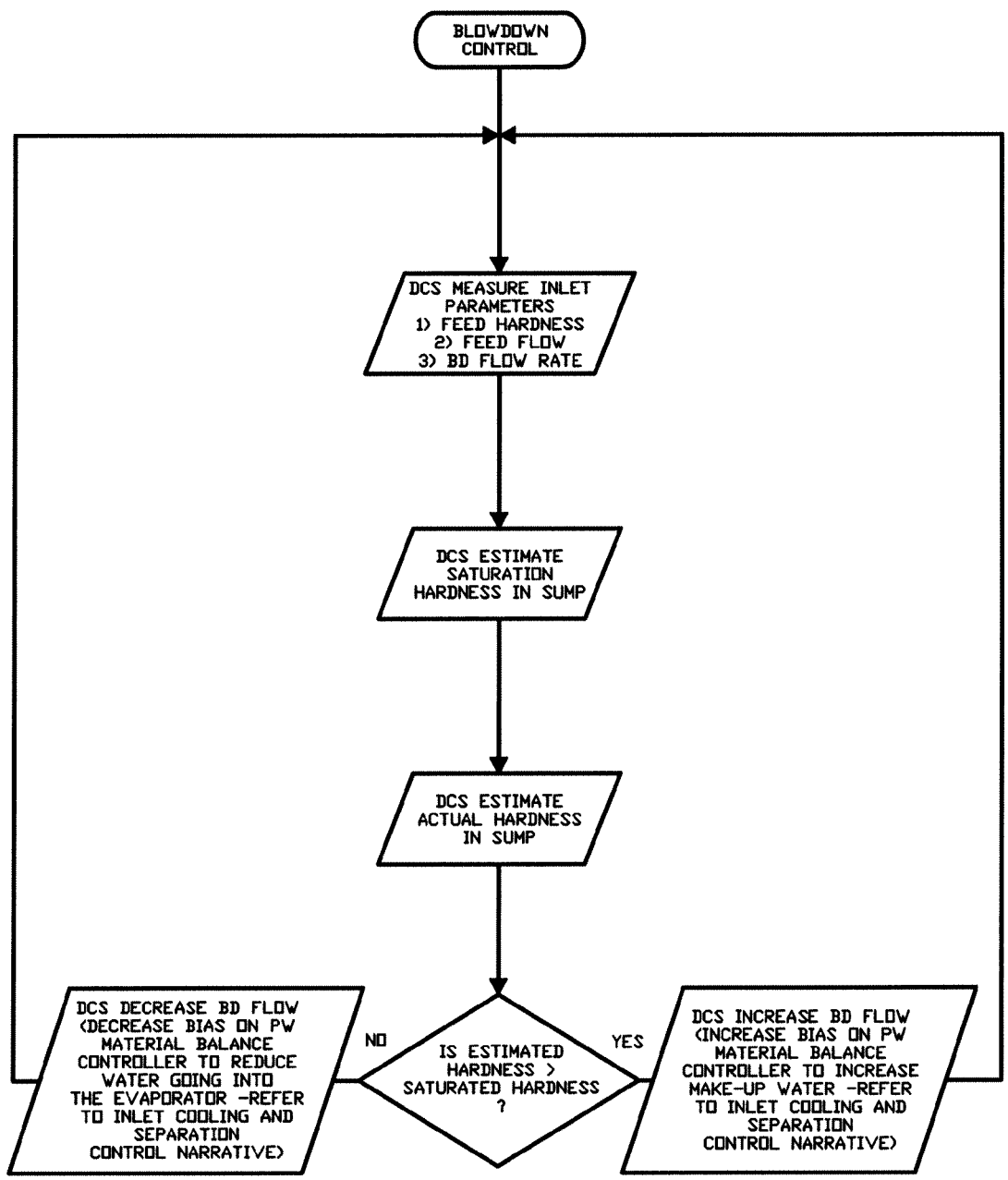
FIG. 11 is a logic diagram for blowdown control.
Figure 12:
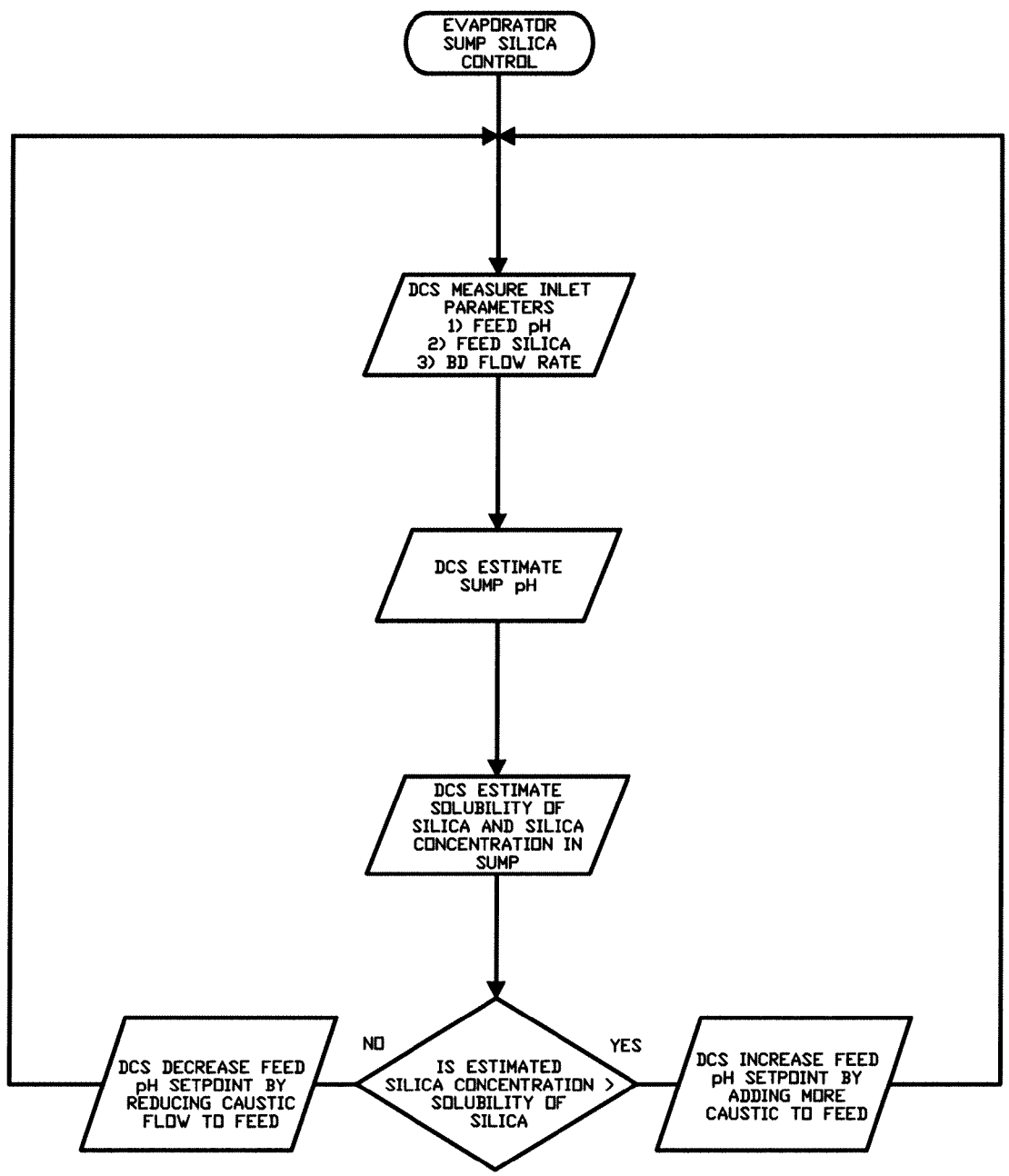
FIG. 12 is a logic diagram for evaporator sump silica control.

The following sections focus on the controls associated with the Evaporator:
 a) Blowdown Sump Level Control (FIG. 11);
 b) Hardness Control;
 c) Makeup Water Control; and
 d) pH Control.

Evaporator feed control is unconventional. The evaporator sump level does not directly manipulate feed rate. In fact, the sump is not controlled directly or even necessarily measured. Instead, the evaporator sump level is the result of the following control scheme.

Blowdown Sump Level Control (FIG. 2)

In the Evaporator sump 14, liquid will overflow a weir 18 from the circulating section to the blowdown section of the Evaporator. The liquid height to flow ratio over a straight edge weir is very narrow and difficult to control. Hence, a "v-notch" weir 18 will be used to help with this control. Level will be maintained in the blowdown sump by level controller 14-LC-001 (or XXX). The output from the controller will manipulate the level control valve on the blowdown line going to the Waste Disposal Tank 43-T-01. The blowdown sump level is controlled very tightly. This provides an indication of flow from the main evaporator sump 14 into the blowdown sump 16, and therefore a directional indication of the main evaporator sump level.

Start-Ups, Shutdowns and Trips

Start-up of this control should be with the level controller in automatic mode. The Brine Pumps should not be started until a level is established in the Evaporator sump 14. The level controller can then stay in automatic mode for most situations.

Hardness Control (FIG. 3)

The flow of distillate 30 to the distillate tank, as well as the blowdown flow 32, is measured to permit direct calculation of evaporator cycles 34. The calculation of evaporator cycles is used in turn to infer sump hardness along with the feed conductivity, 14-AI-xxx. The inferred value is corrected by lab results when available. The sump hardness calculation 14-AY-xxx is used as the process value of the sump hardness controller (14-AC-xxx) 38 to manipulate the set point of the cycles controller, (14-FFC-023) 48. Fewer cycles will result in a lower concentration of hardness in the sump while more cycles will raise the level of hardness. The cycles controller, (14-FFC-023) 38, will manipulate the set-point of the total flow controller 36, (13-FC-037A) 36, 38.

Start-Ups, Shutdowns and Trips

There are a number of inputs to the blowdown ratio control scheme. Prior to putting the system into service Operations will have to ensure that all associated instrumentation is functioning properly. Default values will have to be programmed into the DCS to deal with instruments that are not indicating properly. Provided all are functioning properly and the Evaporator sump is filled, this controller can be put into automatic mode. On a shutdown or trip, it is recommended that this control scheme be taken out of automatic mode.

Makeup Water Control

The cycles controller 34 will directly manipulate the plant water balance by setting the set point for the total flow 36, 38 into the water purification section of the plant, 13-FC-037A. The total flow controller 36 will adjust the makeup water flow directly under normal conditions, and only under upset conditions, will direct water to or from the produced water tank. The makeup water flow set point will be equal to the total flow controller set point less the produced water and boiler blowdowns. The total flow controller 36 thus controls the total flow into the water purification section of the plant. The first water purification unit is the Induced Gas Flotation unit (IGF). The level in the IGF will be controlled very tightly by adjusting the flow into the evaporator. This will effectively pass through the adjustments made by the total flow controller immediately after they are made. There is no meaningful surge capacity in the IGF.

The Produced Water Tank (PWT) will only be used under two exceptional cases:
 a) There is more produced water entering the process as evaporator feed than is required to be purified for boiler feed water due to a boiler or evaporator trip or other short-term upset. In this case, water will be sent to the produced water tank.
 b) The water from the FWKO is off spec and not enough water can be drawn from the wells. In this case, water will be drawn from the produced water tank.

If the level in the PWT gets too high, level controller 13-LC-018 will begin to reduce production from the pads by increasing the Inlet Separator (10-V-01) pressure. In the event of a low level, an alarm will notify the operator to respond accordingly by reducing boiler firing rate before the PW Tank Transfer Pump 13-P-04 trips.

pH Control (FIG. 4)

Evaporator feed pH will be a critical parameter to prevent fouling of the Evaporator internals with silica. Silica will stay in solution provided the pH in the vessel is maintained high enough. The sump silica concentration will be used to determine the set point of the sump pH controller 40. Both sump silica concentration and sump pH will be calculated in a manner similar to the calculation of sump hardness. The sump pH controller, (14-AC-xxx) 40, will in turn determine the set-point of the inlet pH controller, (14-AC-002) 42, which will adjust the flow of caustic to the evaporator sump.

Figure 13:
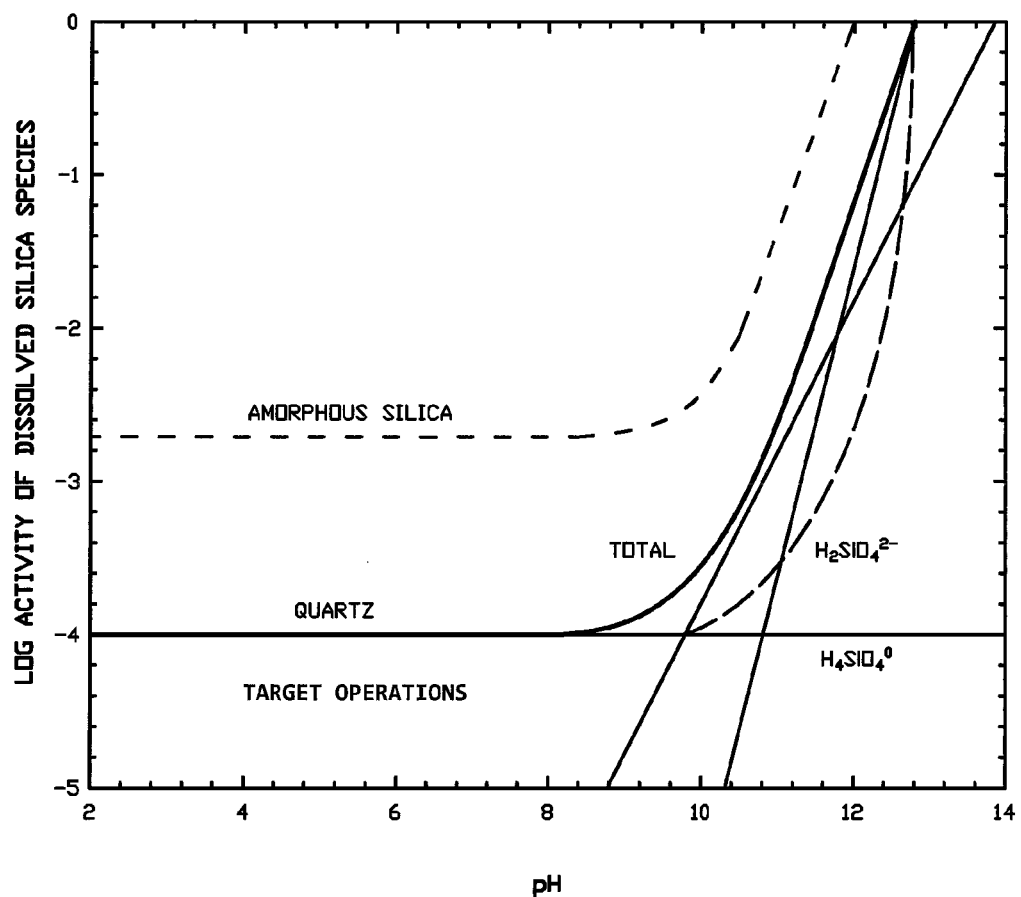
FIG. 13 is a graph illustrating the dependence of silica solubility on pH.
Figure 14:
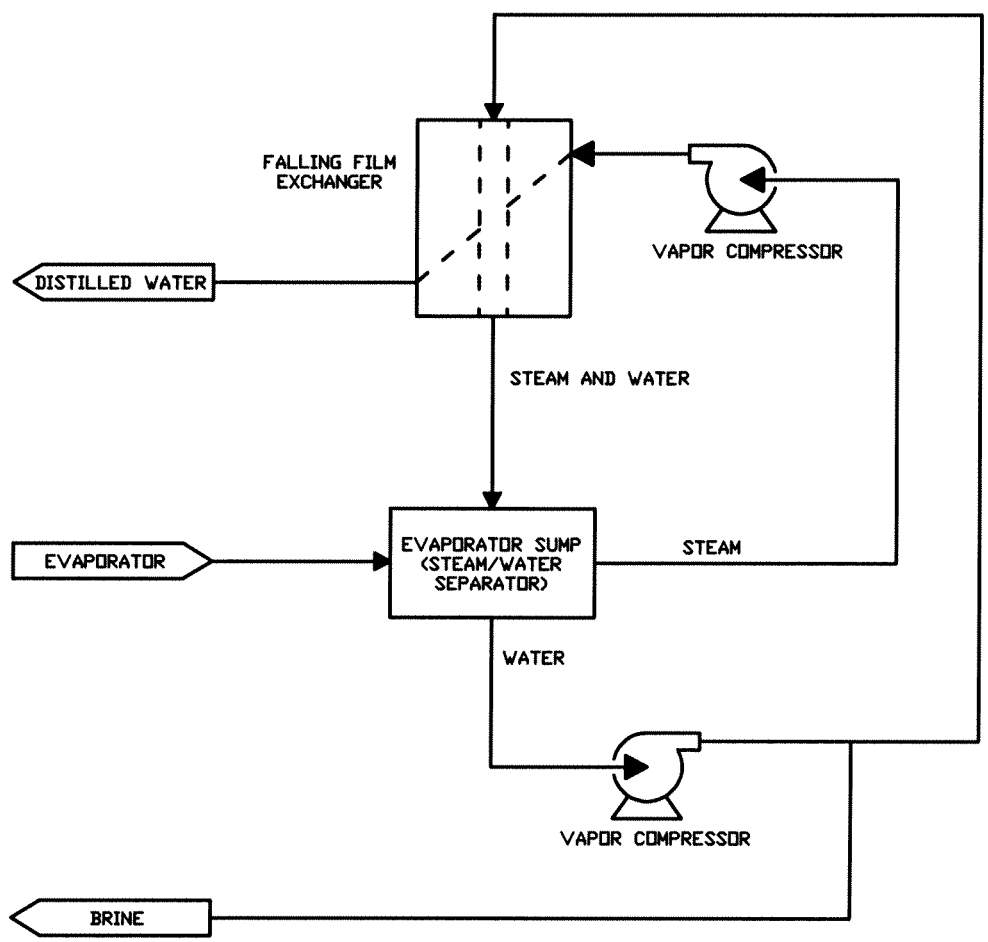
FIG. 14 is a schematic view of a typical MVC Evaporator System as found in a prior art.

The target pH specification is calculated based on the silica concentration in the controller, which determines the set point for the pH controller 42 and is adjusted to account for the concentration in the sump due to removal of distillate. The objective is to keep the sump pH at a level that provides a safe margin from the point where silica will precipitate from solution. The FIG. 13 illustrates the dependence of silica solubility on pH.

Start-Ups, Shutdowns and Trips

As with the blowdown ratio control, there are a number of inputs to this control scheme. Prior to putting the system into service, Operations will have to ensure that all associated instrumentation is functioning properly. Default values will have to be programmed into the DCS to deal with instruments that are not indicating properly. Provided all are functioning properly and the Evaporator sump is filled, this controller can be put into automatic mode. On a shutdown or trip, it is recommended that this control scheme be taken out of automatic mode.

Preferable Mode of Operation of the Water Treatment Unit

The equipment in these areas of the plant and in turn, covered in this control narrative includes:
a) Distillate Tank (14-V-02) 20;
b) Evaporator Vapour Compressor 14-C-01;
c) Distillate Product Pumps 14-P-02 A/B;
d) Steam Generation;
e) Boiler Feed Water (BFW) Tank 15-T-01;
f) HP BFW Pumps 15-P-01 A/B;
g) BFW Booster Pump 15-P-02;
h) Dump Condenser 15-E-02; and
i) Package Boiler 15-X-01, comprised of:
a. Steam Drum 15-V-01;
b. Boiler 15-B-01; and
c. Air Pre-heater 15-E-01.

The intent of this section is to:
a) Provide a high-level process overview of the BFW supply system; and
b) Explain how BFW is directly fed from the Distillate Tank 20 to the Boiler using the BFW Tank as a volume buffer.

This part of the plant will draw water from the Distillate Tank 20 on an as needed basis with water fed directly to the Boiler. In the event of a small, sudden increase or decrease in demand, the system will respond by adjusting the speed or the Inlet Guide Vanes (IGVs) of the Evaporator Vapour Compressor. If the change in demand is faster than the Evaporator Compressor can respond, the system will send or draw water from the BFW Tank until the Compressor catches up. Controls on the tank will eventually take its level back to set point by slowly sending or taking water from the system. The controls associated with equipment in and upstream of the Evaporator 14-V-01 will adjust to maintain a reliable supply of distillate.

The overall control objective for this part of the plant is to supply the necessary BFW to the boiler so it can produce the steam to meet the desired injection requirements.

There are two main controllers discussed in detail:
1) Distillate Tank Level Control and Pump Minimum Flow Control (FIG. 5): the objective of this control is to maintain the Distillate Tank 20 at a desired set-point for all upset conditions (large or small) while ensuring minimum flow for pumps.
2) BFW Tank Level Control (FIG. 6): the objective of this control is to maintain the level in the tank without impacting the rest of the system.

Process Description

Distillate is produced in the Evaporator Package 14-X-01. Condensed water gravity flows to the Distillate Tank 20. Primarily, the rate of evaporation and subsequent production of distillate is determined by the speed of the Evaporator Vapour Compressor, the position of the IGVs, and the amount of heat added to the system. Water is pumped from the Distillate Tank 20 to the Boiler using two sets of pumps in series: 1) the Distillate Product Pumps and 2) the High Pressure (HP) Boiler Feed Water Pumps. The HP BFW Pumps raise the BFW pressure to 5,790 kPaG and pumps the distillate through the Inlet Coolers 10-E-01 A/B for heat recovery. The normal BFW temperature leaving the Inlet Coolers will be approximately 145° C. The pre-heated HP BFW will be sent to the Package Boiler directly, based on a demand set by the steam drum level control valve. As Boiler demand rises and falls relative to what is being delivered by the Evaporator, water will be directed to and from the BFW Tank. The BFW Tank level will be maintained at approximately 80% of level range.

The Boiler is a drum style configuration that produces steam at 4,200 kPag and superheated by 25° C. to prevent condensation in the steam pipeline going to the well pads. The combustion air is heated to 90° C., by recovering heat from the glycol return stream in the Air Pre-heater 15-E-01.

The Steam Drum has an average blowdown rate of 2%, which is recycled back to the process through the Flash Drum 13-V-03.

A portion of the 4,200 kPaG steam is let down to 500 kPaG and de-superheated with HP BFW for use as utility steam. The majority of this steam is used in the Water Treatment System for start-up of the Evaporator. The steam header also receives steam from the Heat Recovery Steam Generator (HRSG) 40-X-01, which recovers heat from the gas turbine producing the site power requirements.

Control Philosophy

This section focuses on the following controls:
a) Distillate Tank Level and Pump Minimum Flow Control; and
b) BFW Tank Level Distillate Tank Level and Pump Minimum Flow Control (FIG. 5)

Boiler controls will be standard and included by the vendor with the supplied package. BFW flow to the Steam Drum will be controlled by the drum's level valve. BFW will be directly fed from the Distillate Tank 20 to the Boiler through a series of pumps. Changes in Boiler demand will have a direct impact on the level in the Distillate Tank 20. Level in the tank will be controlled via two level controllers, 14-LC-042 and 14-LC-043.

The output from the first controller 14-LC-042 will be tied to the Evaporator Vapour Compressor speed controller 14-SC-044 and 15-FV-007 (through high select 15-FY-007) on the line from the discharge of the Distillate Product Pumps to the BFW Tank. 14-LC-042 will be tuned aggressively since the Distillate Tank 20 is small and response to disturbances will have to be quick. The compressor will not be able to adjust its speed very fast. If the BFW demand suddenly decreases, the level in the Distillate Tank 20 will begin to rise. On a rising level, 14-LC-042 will call for the compressor to slow down. If the compressor does not respond fast enough the output from 14-LC-042, 14-LC-042 will then call for 15-FV-007 to open so distillate can be sent to the BFW Tank.

If the BFW demand suddenly increases, the level in the Distillate Tank 20 will begin to fall. On a falling level, 14-LC-042 will call for the compressor to speed up. If the level continues to fall, a low-low alarm on 14-LC-042 will activate. This will signal for the BFW Booster Pump to start. The second level controller 14-LC-043 will then start opening 15-LV-027 (through high select 15-LY-027) on the line, going from the discharge of the BFW Booster Pump to the suction of the HP BFW Pumps.

A minimum flow through the Distillate Product Pumps will be maintained by 14-FC-008. The output from that controller will control 14-FV-008, which will allow distillate to circulate from the discharge of the Distillate Product Pumps back to the Distillate Tank 20. 15-FC-007 will maintain a minimum flow through the HP BFW Pumps. The output from that controller will control 15-FV-007 (through the high select block 15-FY-007), which will allow BFW (distillate) to flow from the discharge of the HP BFW Pumps to the BFW Tank.

BFW Tank Level Control (FIGS. 6, 7-10)

Level in the BFW Tank will be maintained at approximately 80%. If the level drops, the output from the level controller will slowly increase to open the valve to send BFW to the tank. So as not to upset the BFW system, the controller will be de-tuned to match the Evaporator Vapour Compressor's dynamics. If the level rises above 85%, the controller will be used to start the BFW Booster Pump to slowly draw the level down in the tank.

The output from 15-LC-027 will go to 15-FV-007 and 15-LV-027 through the high select blocks 15-FY-007 and 15-LY-027 respectively. 15-LC-027 will be tuned so as not to allow a flow rate change in or out of the BFW Tank to exceed the reaction time of the Evaporator Vapour Compressor speed control. When the measured level is at set point, the output from 15-LC-027 will be at 50% and therefore will not be calling for 15-FV-007 or 15-LV-027 to be open.

If the level in the tank is more than 5% above set point, the BFW Booster Pump will automatically start, the output from 15-LC-027 will start to increase, and 15-LV-027 (through high select 15-LY-027) will begin to open. This will allow BFW to flow from the BFW Tank to the suction of the HP BFW Pumps. Once the level in the BFW Tank has decreased to within 1% of set point, the BFW Booster Pump will automatically be turned off. If the level in the tank is below set point, the output from the controller will decrease and 15-FV-007 (through high select 15-FY-007) will begin to open. This will allow BFW to flow from the discharge of the HP BFW Pumps to the BFW Tank. 15-LC-027 will then close the valve once the level in the tank is at set point.

Start-Ups, Shutdowns and Trips/Malfunctions

In the event of a boiler trip the following events will occur:
a) The minimum flow programming will send BFW to the BFW tank;
b) Level in the distillate tank 20 will rise, causing the Evaporator Vapour Compressor to slow down;
c) The level in the Evaporator will rise. This will cause the system to back makeup water out and to send produced water to the Produced Water (PW) Tank; and
d) Operations will have to watch the level in the BFW Tank, as it will likely be the first tank to reach its high level limit. At that point the evaporator would have to be put into recycle mode and produced water would be sent directly to the PW Tank.

On start-up, the Evaporator would be started in recycle mode where BFW would be circulated from the Distillate Product Pumps and HP BFW Pumps to the BFW Tank and then back to the suction of the HP BFW Pumps. Once the Boiler has started up, the BFW Tank level should be drawn down prior to swinging distillate to the HP BFW pumps. At that point, all controllers should be placed in automatic mode, and the system will slowly ramp itself up as the Boiler's demand increases.

Those and other benefits of the disclosed system and its parts and specifically elimination of unnecessary heaters, coolers, and storage tanks makes it suitable for use in a mobile modular SAGD system in which the size of the equipment is paramount.

As many changes can be made to the preferred embodiment of the invention without departing from the scope thereof; it is intended that all matter contained herein be considered illustrative of the invention and not in a limiting sense.

I claim:

1. A closed loop contaminant control system for an evaporative water purification process in an SAGD (Steam Assisted Gravity Drainage) system for a heavy oil recovery facility, the system comprising:
an evaporator including a tube side for producing steam and a shell side for producing distilled water, a bottom, a water inlet, at least one distilled water discharge and at least one oil and brine water discharge, a sump provided at the bottom proximate said at least one oil and brine water discharge thereof, an oil skimming weir dividing the sump into a main sump and a blowdown sump, said at least one oil and brine water discharge being located proximate said blowdown sump;
a distillate tank for receiving distilled water from said evaporator and for discharging distilled water where said distillate tank has a level controller for controlling 1) the energy supplied to the evaporator and 2) distilled water production;
a plurality of controllers comprising:
a distilled water flow meter located proximate the at least one distilled water discharge of said evaporator,
a blowdown flow meter measuring a flow from the main sump to the blowdown sump,
a cycle controller calculating a ratio between a distilled water flow and a blowdown flow;
a total flow controller for adjusting a flow of make-up water into said evaporator;
a hardness controller for providing a set point of the cycle controller affecting the flow of the make-up water into said evaporator; and
a pH controller for adjusting a flow of a caustic to the evaporator sump; wherein a set point for the pH controller is determined by silica concentration in the make-up water.

2. The system of claim 1 wherein the evaporator has three modes of operation:
1) a normal mode wherein the evaporator receives water from the evaporative water purification process, the blowdown sump discharges waste oil and brine, and the distillate tank discharges distilled water.
2) an idle mode wherein there is no flow in or out of the evaporator; and
3) a recycle mode wherein the distilled water is recycled into the water inlet of the evaporator.

3. The system of claim 1 wherein the weir separating the main sump and the blowdown sump further comprises a top and a bottom, said weir further comprising a v-notch located proximate the top.

4. The system of claim 3 wherein said weir is located in said sump such that any oil floating on top of the water in the main sump is continuously removed from the evaporator with the brine water.

5. A closed loop contaminant control system for an evaporative water purification process in an SAGD (Steam Assisted Gravity Drainage) system for a heavy oil recovery facility, the system comprising:
an evaporator including a tube side for producing steam and a shell side for producing distilled water, a bottom, a water inlet, at least one distilled water discharge and at least one oil and brine water discharge, a sump provided at the bottom proximate said at least one oil and brine water discharge thereof, an oil skimming weir dividing the sump into a main sump and a blowdown sump, said at least one oil and brine water discharge being located proximate said blowdown sump;
a distillate tank for receiving distilled water from said evaporator and for discharging distilled water where said distillate tank has a level controller for controlling 1) the energy supplied to the evaporator and 2) distilled water production;
wherein the weir comprises a v-notch cutout proximate an upper edge of the weir; and
a plurality of controllers for the system, wherein the plurality of controllers comprises:
a distilled water flow meter located proximate the at least one distilled water discharge of said evaporator, a blowdown flow meter measuring a flow from the main sump to the blowdown sump, a cycle controller calculating a ratio between a distilled water flow and a blowdown flow;

a total flow controller adapted to adjust a flow of make-up water into said evaporator;

a hardness controller for providing a set point of the cycle controller affecting the flow of the make-up water into said evaporator; and a pH controller for adjusting a flow of a caustic to the evaporator sump; wherein a set point for the pH controller is determined by silica concentration in the make-up water.

6. The system of claim 5 wherein said weir is located in said sump such that any oil floating on top of the water in the main sump is continuously removed from the evaporator via the weir so as to retard foaming events in the evaporator.

\* \* \* \* \*